United States Patent
Zhang et al.

(10) Patent No.: US 11,733,398 B2
(45) Date of Patent: Aug. 22, 2023

(54) VEHICLE POSITIONING METHOD FOR DETERMINING POSITION OF VEHICLE THROUGH CREATING TARGET FUNCTION FOR FACTOR GRAPH MODEL

(71) Applicant: Apollo Intelligent Driving Technology (Beijing) Co., Ltd., Beijing (CN)

(72) Inventors: Songpeng Zhang, Beijing (CN); Pengbin Yang, Beijing (CN); Jianxu Zhang, Beijing (CN); Xiaohui Zhu, Beijing (CN); Xuguang Lv, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/931,777

(22) Filed: Sep. 13, 2022

(65) Prior Publication Data
US 2023/0043236 A1  Feb. 9, 2023

(30) Foreign Application Priority Data

Nov. 18, 2021 (CN) ............. 202111367474.6

(51) Int. Cl.
*G01S 19/47* (2010.01)
*G01C 21/28* (2006.01)
*G01C 21/30* (2006.01)

(52) U.S. Cl.
CPC .................. *G01S 19/47* (2013.01)

(58) Field of Classification Search
CPC ......... G01S 19/47; G01S 19/42; G01C 21/00; G01C 21/28; G01C 21/30; G01C 21/005
See application file for complete search history.

(56) References Cited

U.S. PATENT DOCUMENTS

| | | | | |
|---|---|---|---|---|
| 2018/0304891 | A1* | 10/2018 | Heidenreich | B60W 30/12 |
| 2020/0217666 | A1* | 7/2020 | Zhang | G01S 17/89 |
| 2022/0018962 | A1* | 1/2022 | Pan | G01S 17/931 |
| 2022/0292711 | A1* | 9/2022 | Pan | G06T 7/75 |

FOREIGN PATENT DOCUMENTS

| | | |
|---|---|---|
| CN | 107310550 A | 11/2017 |
| CN | 112595330 A | 4/2021 |
| CN | 113175938 A | 7/2021 |

OTHER PUBLICATIONS

Wilbers, Daniel et al., "Localization with Sliding Window Factor Graphs on Third-Party Maps for Automated Driving", May 20-24, 2019, 2019 International Conference on Robotics and Automation (ICRA), pp. 5951-5957.*

* cited by examiner

*Primary Examiner* — Manuel L Barbee
(74) *Attorney, Agent, or Firm* — Hunton Andrews Kurth LLP

(57) ABSTRACT

The present disclosure provides a vehicle positioning method implemented by an electronic device, including: obtaining sensor data about N frames of a vehicle through a sliding window, N being a positive integer; creating a target function for a factor graph model in accordance with the sensor data about the N frames, and performing optimization solution on the target function; and determining a pose and a position of the vehicle in accordance with a target value obtained through the optimization solution on the target function.

17 Claims, 6 Drawing Sheets

VEHICLE POSITIONING METHOD FOR DETERMINING POSITION OF VEHICLE THROUGH CREATING TARGET FUNCTION FOR FACTOR GRAPH MODEL

CROSS-REFERENCE TO RELATED APPLICATION

This application claims a priority of the Chinese patent application No. 202111367474.6 filed on Nov. 18, 2021, which is incorporated herein by reference in its entirety.

TECHNICAL FIELD

The present disclosure relates to the field of automatic driving technology, in particular to the field of vehicle positioning technology, more particularly to a vehicle positioning method, a vehicle positioning device, and an electronic device.

BACKGROUND

High-precision services, as an indispensable functional module for automatic driving, are achieved in accordance with high-precision map data in combination with data from such devices as a camera and an Inertial Measurement Unit (IMU) as well as information about vehicle speed and wheel speed, so as to determine a relative position of a vehicle or a lane model, and provide high-precision map information. Currently, vehicle information about the vehicle is obtained mainly through matching perceptual data about a single frame with a high-precision map.

SUMMARY

An object of the present disclosure is to provide a vehicle positioning method, a vehicle positioning device and an electronic device, so as to solve the problems in the related art.

In one aspect, the present disclosure provides in some embodiments a vehicle positioning method, including: obtaining sensor data about N frames of a vehicle through a sliding window, N being a positive integer; creating a target function for a factor graph model in accordance with the sensor data about the N frames, and performing optimization solution on the target function; and determining a pose and a position of the vehicle in accordance with a target value obtained through the optimization solution on the target function.

In another aspect, the present disclosure provides in some embodiments a vehicle positioning device, including: an obtaining module configured to obtain sensor data about N frames of a vehicle through a sliding window, N being a positive integer; an optimization module configured to create a target function for a factor graph model in accordance with the sensor data about the N frames, and perform optimization solution on the target function; and a determination module configured to determine a pose and a position of the vehicle in accordance with a target value obtained through the optimization solution on the target function.

In yet another aspect, the present disclosure provides in some embodiments an electronic device, including at least one processor, and a memory in communication with the at least one processor. An instruction is stored in the memory and executed by the at least one processor, so as to implement the above-mentioned vehicle positioning method.

In still yet another aspect, the present disclosure provides in some embodiments a non-transitory computer-readable storage medium storing therein a computer instruction. The computer instruction is executed by a computer so as to implement the above-mentioned vehicle positioning method.

In still yet another aspect, the present disclosure provides in some embodiments a computer program product including a computer program. The computer program is executed by a processor so as to implement the above-mentioned vehicle positioning method.

According to the embodiments of the present disclosure, after obtaining the sensor data about the N frames of the vehicle, the target function for the factor graph model is created in accordance with the sensor data about the N frames, so as to determine the position of the vehicle. As a result, it is able to determine the pose and the position of the vehicle effectively in accordance with the sensor data, thereby to improve the positioning accuracy.

It should be understood that, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

The present disclosure provides in some embodiments a vehicle positioning method.

Figure 1:
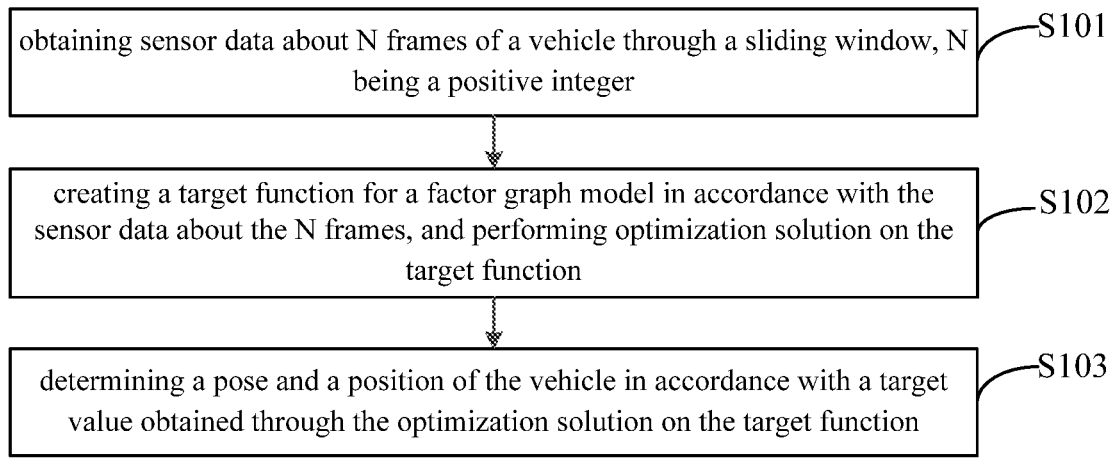
FIG. 1 is a flow chart of a vehicle positioning method according to one embodiment of the present disclosure.

As shown in FIG. 1, which is a flow chart of the vehicle positioning method according to one embodiment of the present disclosure, the vehicle positioning method includes the following steps.

Step S101: obtaining sensor data about N frames of a vehicle through a sliding window, N being a positive integer.

It should be appreciated that, the vehicle positioning method in the embodiments of the present disclosure is applied to an electronic device, e.g., mobile phone, tablet computer, computer or vehicle-mounted terminal. In the following description, the vehicle positioning method is executed by the electronic device.

In the embodiments of the present disclosure, the electronic device obtains the sensor data about the N frames of the vehicle through a predetermined sliding window. The sliding window is a window having a fixed length and slidable in one direction, i.e., the maximum quantity of frames capable of being obtained through the sliding window is fixed. For example, when the sliding window is capable of obtaining at most 10 frames, a value of N is not greater than 10.

Figure 2:
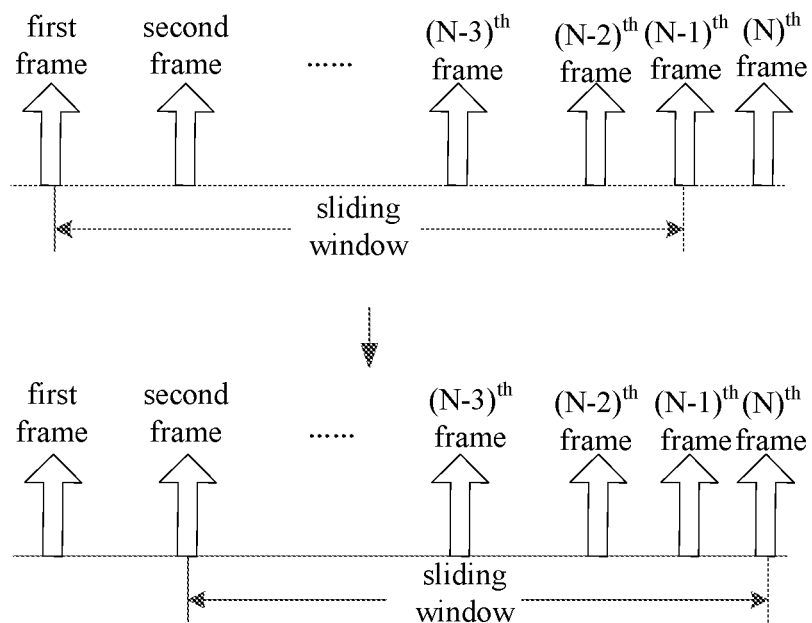
FIG. 2 is a schematic view showing a sliding window in the vehicle positioning method according to one embodiment of the present disclosure.

For example, as shown in FIG. 2, in the process of sliding, the sliding window removes sensor data about a frontmost frame each time sensor data about a new frame is obtained, so it is able to ensure that the quantity of frames in the sliding window is constant.

Step S102: creating a target function for a factor graph model in accordance with the sensor data about the N frames, and performing optimization solution on the target function.

In this step, the electronic device creates the target function for the factor graph model in accordance with the obtained sensor data about the N frames, or creates the target function for the factor graph model in the case that the quantity of frames in the sliding window meets a maximum value. For example, the maximum quantity of frames available for the sliding window is a predetermined value, e.g., 10, and when N is 10, the target function for the factor graph model is created in accordance with the sensor data about the 10 frames.

It should be appreciated that, a factor graph is a bipartite graph, which includes two types of nodes, i.e., variable nodes and factor nodes. The variable node refers to a to-be-estimated optimization variable, and the factor node refers to a constraint of the obtained sensor data on the optimization variable. All the factors are multiplied to obtain joint probability distribution of all the variables, and state estimation refers to finding an optimal variable to maximize a joint probability. In order to take a logarithm and an opposite number for the factor conveniently, the multiplication is replaced with summation, and the finding of a maximum value is replaced with the finding of a minimum value. In the embodiments of the present disclosure, the target function for the factor graph model created in accordance with the sensor data about the N frames is expressed as $$L(x) = \sum_k r_k^T \Omega_k r_k,$$

where x is an optimization variable, $r_k$ represents a residual, T represents a vector transposition matrix, $\Omega_k$ represents an information matrix corresponding to each residual and it is an inverse matrix of a covariance matrix $\Sigma_k$, and an optimization target is $$\min_x L(x).$$

In a possible embodiment of the present disclosure, the sensor data about each frame includes GNSS data, lane line data, wheel speed meter data, and IMU data. The target function for the factor graph model is related to a GNSS constraint, a lane line constraint, a wheel speed meter speed constraint, a pre-integration constraint and a marginalization constraint. The GNSS constraint is obtained in accordance with the GNSS data, the lane line constraint is obtained in accordance with the lane line data, the wheel speed meter speed constraint is obtained in accordance with the wheel speed meter data, the pre-integration constraint is obtained in accordance with the wheel speed meter data and the IMU data, and the marginalization constraint is obtained in accordance with target sensor data about all frames. The target sensor data is at least one of the GNSS data, the lane line data, the wheel speed meter data or the IMU data.

It should be appreciated that, each of the GNSS data, the lane line data, the wheel speed meter data and the IMU data is obtained through a corresponding sensor or any other relevant device. For example, the lane line data is obtained through a camera on the vehicle, and the wheel speed meter data is obtained through a speed sensor on the vehicle.

In a possible embodiment of the present disclosure, the sensor data about the vehicle is obtained in real time, and the sensor data about different frames is sensor data obtained at different time points. In the embodiments of the present disclosure, N is an integer greater than 1. The electronic device creates the target function for the factor graph model in accordance with the sensor data about the N frames, and solves the target function for the factor graph model in accordance with the GNSS data, the IMU data, the wheel speed meter data and the lane line data at a plurality of time points. Through the fusion of a plurality of pieces of sensor data, it is able to improve the positioning accuracy of the vehicle.

Figure 3:
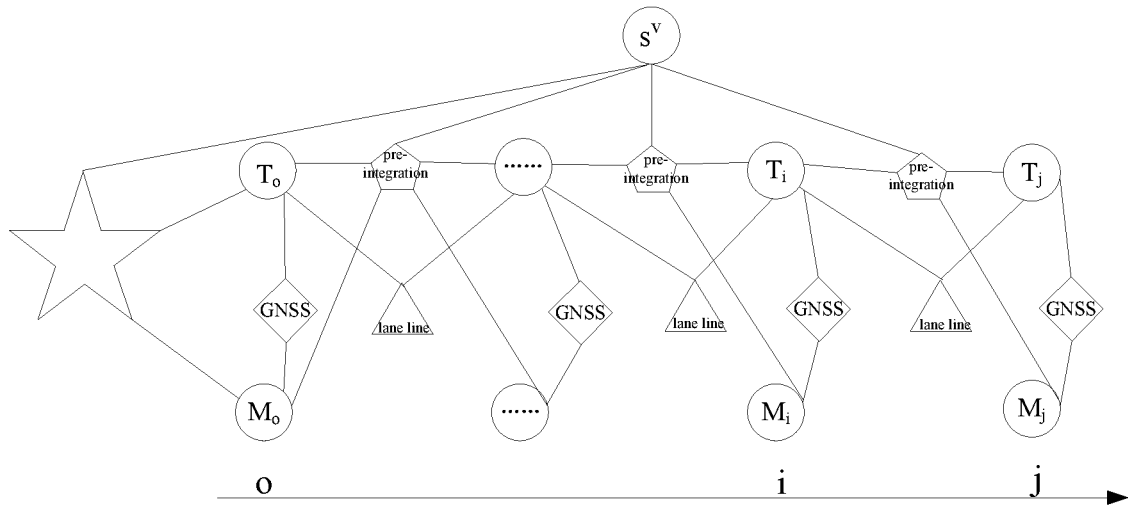
FIG. 3 is a schematic view showing a factor graph model in the vehicle positioning method according to one embodiment of the present disclosure.

FIG. 3 shows the factor graph model adopted in the embodiments of the present disclosure. In FIG. 3, each circle represents a variable node (also called as optimization variable), and the other shapes represent factor nodes. There are five types of variable nodes, i.e., a position, a pose, a speed, a zero offset of a gyroscope, and a scale of a wheel speed meter. In FIG. 3, a circular node T (e.g., $T_o$, $T_i$ or $T_j$) represents the position and pose, a circular node M (e.g., $M_o$, $M_i$ or $M_j$) represents the speed and the zero offset of the gyroscope, and a node $s^v$ represents the scale of the wheel speed meter. Due to such causes as an error in a radius of a wheel, there is a scaling factor between a vehicle speed measured by the wheel speed meter and an actual speed, so the scale of the wheel speed meter may be estimated. There are four types of factor nodes, i.e., a GNSS constraint, a pre-integration constraint, a lane line constraint and a marginalization constraint. In FIG. 2, a diamond-shape node represents the GNSS constraint, a pentagonal node represents the pre-integration constraint (also called as wheel speed meter/IMU constraint), an equilateral-triangle node represents the lane line constraint, and a star-shape node represents the marginalization constraint. In a possible embodiment of the present disclosure, in order to control the influence of an external node on the optimization solution of the factor graph model, a robust kernel function may be added to the constraint provided by the sensor for capturing the data, e.g., the GNSS data and the lane line data, for which abnormalities occur.

As shown in FIG. 3, the factor node and the corresponding variable node are connected to each other through a straight line, and a constraint factor may directly affect a variable connected thereto. In addition, the constraint factor may also indirectly affect the other variables through the variable connected thereto. For example, the GNSS constraint and the pre-integration constraint affect the speed simultaneously, and the pre-integration constraint is related to the scale of the wheel speed meter, so the GNSS constraint indirectly affects the scale of the wheel speed meter. As shown in FIG. 3, the GNSS constraint provides a constraint on a position, a yaw angle and a speed, so the optimization variables directly associated with the GNSS constraint factor include $T_k$ (in FIG. 3, k=o, . . . , i, j, where o represents a first frame in the sliding window and j represents a last frame in the sliding window) and $M_k$. The pre-integration constraint provides a constraint on a relative pose and a relative speed between adjacent frames, the scale of the wheel speed and the zero offset instability, so the associated optimization variables include $T_{k-1}$, $T_k$, $M_{k-1}$, $M_k$ and $s^v$. The optimization variables associated with the lane line constraint include poses $T_h$ and $T_k$ (h represents a previous frame of k) in two frames. The marginalization constraint is a constraint of a relevant factor on a remaining variable node when an oldest frame is marginalized, and an associated variable is related to the marginalized factor.

In another possible embodiment of the present disclosure, apart from the GNSS data, the lane line data, the wheel speed meter data and the IMU data, the sensor data about each frame further includes high-precision map data. At this time, the target function for the factor graph model is further related to a high-precision map matching constraint. The high-precision map matching constraint is obtained in accordance with the high-precision map data and the lane line data.

Figure 4:
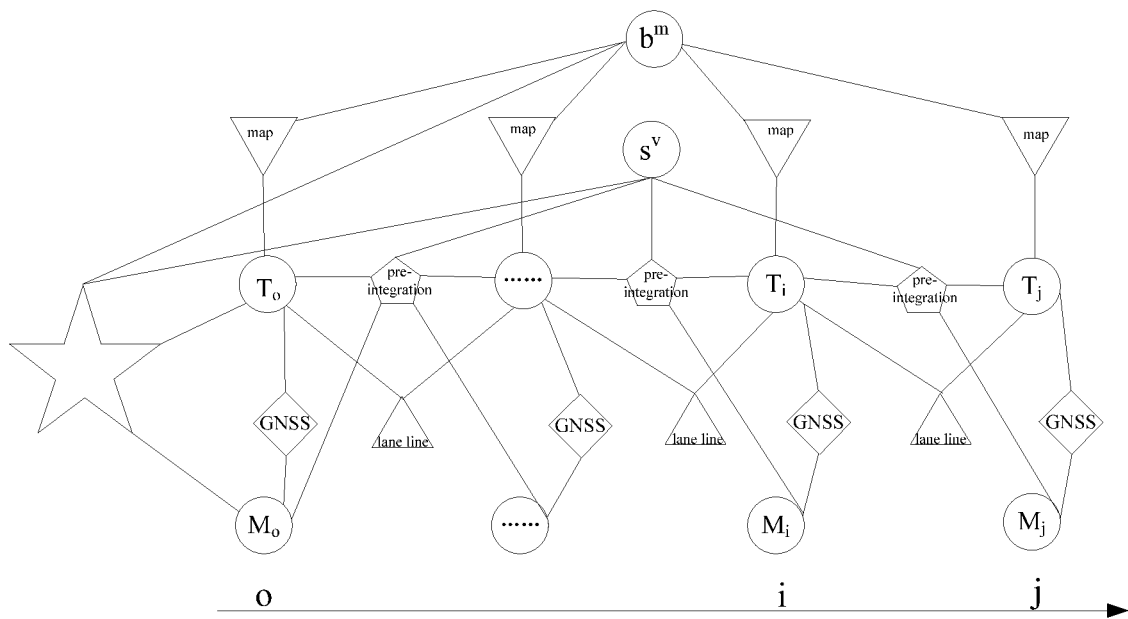
FIG. 4 is another schematic view showing the factor graph model in the vehicle positioning method according to one embodiment of the present disclosure.

FIG. 4 shows another available factor graph mode in the embodiments of the present disclosure. As shown in FIG. 4, there are six types of variable nodes for the factor graph model, i.e., the position, the pose, the speed, the zero offset of the gyroscope, the scale of the wheel speed meter, and an offset of a high-precision map, and there are five types of factor nodes, i.e., the GNSS constraint, the pre-integration constraint, the lane line constraint, the marginalization constraint and the high-precision map matching constraint. In FIG. 4, a node T represents the position and the pose, a node M represents the speed and the offset of the gyroscope, a node $s^v$ represents the scale of the wheel speed meter, a node $b^m$ represents the offset of the high-precision map, a diamond-shape node represents the GNSS constraint, a pentagonal node represents the pre-integration constraint (also called as wheel speed meter/IMU constraint), an equilateral-triangle node represents the lane line constraint, a star-shape node represents the marginalization constraint, and an inverted-triangle node represents the high-precision map matching constraint. As shown in FIG. 4, the offset of the high-precision map is associated with the high-precision map matching constraint, the high-precision map matching constraint is associated with the position and the pose, and the position and the pose are affected by the pre-integration constraint, the GNSS constraint and the marginalization constraint. In the embodiments of the present disclosure, the pose and the position of the vehicle are calculated using the target function through the high-precision map matching as well as the fusion of the sensor data about a plurality of frames, i.e., the GNSS data, the IMU data, the wheel speed meter data and the lane line data at different time points. Due to the introduction of the high-precision map matching, the pose and the position of the vehicle are associated with the high-precision map matching, so it is able to improve the positioning accuracy of the vehicle.

In a possible embodiment of the present disclosure, the target function is created for the factor graph model in FIG. 4 subsequently, so as to calculate the pose and the position of the vehicle.

Step S103: determining a pose and a position of the vehicle in accordance with a target value obtained through the optimization solution on the target function.

In the embodiments of the present disclosure, the sensor data about the vehicle includes the GNSS data, the lane line data, the vehicle speed meter data and the IMU data. The factor graph model is created in accordance with the sensor data about the N frames, so as to obtain the target function for the factor graph model. Then, the optimization solution is performed on the target function, so as to obtain the target value, i.e., the pose and the position of the vehicle.

As mentioned hereinabove, the factor graph model includes the variable nodes and the factor nodes. In the embodiments of the present disclosure, the target function for the factor graph model is created in accordance with the sensor data about the N frames, and a value of N is related to a length of the sliding window, i.e., the amount of the sensor data is limited by the sliding window In this way, the quantity of variables to be optimized during the calculation using the target function is limited, so it is able to prevent reduce a computational burden for the factor graph model, thereby to obtain the pose and the position of the vehicle more conveniently. In addition, when the value of N is limited through the length of the sliding window, it is able to calculate the pose and the position of the vehicle in accordance with the sensor data about the plurality of frames. As compared with a situation where the pose and the position of the vehicle are calculated in accordance with single-frame data, in the embodiments of the present disclosure, the pose and the position of the vehicle are calculated in accordance with the fusion of the sensor data about the plurality of frames as well as the association among the sensor data about the plurality of frames, so as to improve the positioning accuracy.

In a possible embodiment of the present disclosure, the pose and the position obtained after the optimization solution are represented by coordinates in a world coordinate system. The world coordinate system is defined as a local east, north, up (ENU) coordinate system, and an origin of the local ENU coordinate system is obtained in accordance with GNSS data corresponding to an intermediate frame in the N frames.

For ease of understanding, the six optimization variables involved in the factor graph model in FIG. 4 are shown in the following table.

| Optimization variables | Nominal value | Error | Updating mode | Degree of freedom | Description |
|---|---|---|---|---|---|
| Position | $p = (x, y, z)^T$ | $\delta p$ | $p + \delta p$ | 3 | a position of a vehicle body in a world coordinate system |
| Pose | $q = (q_w, q_x, q_y, q_z)^T$ (R) | $\delta\theta$ | $q\exp(\delta\theta/2)$ ($R\exp(\delta\theta)$) | a global degree of freedom is 4, and a local degree of freedom is 3 | a pose of the vehicle body in the world coordinate system |
| Speed | $v = (v_x, v_y, v_z)^T$ | $\delta v$ | $v + \delta v$ | 3 | a speed of the vehicle body in the world coordinate system |
| Zero offset of gyroscope | $b^g = (b_x^g, b_y^g, b_z^g)^T$ | $\delta b^g$ | $b^g + \delta b^g$ | 3 | zero offsets of a gyroscope in three directions |
| Scale of wheel speed meter | $s^v$ | $\delta s^v$ | $s^v + \delta s^v$ | 1 | a scaling factor between a speed measured by a wheel speed meter and an actual speed |
| Offset of high-precision map | $b^m = (b_x^m, b_y^m, b_z^m)^T$ | $\delta b^m$ | $b^m + \delta b^m$ | 3 | an offset of the high-precision map relative to a geographic coordinate system in the world coordinate system |

It should be appreciated that, in the table, x, y and z represent an x-axis, a y-axis and a z-axis in the world coordinate system (i.e., the local ENU coordinate system) respectively. When solving the target function, a value to be optimized really is an error of each optimization variable rather than a nominal value. A degree of freedom of the nominal value is called as a global degree of freedom, and a degree of freedom of the error is called as a local degree of freedom. A global degree of freedom of a free variable is equal to its local degree of freedom. Apart from the pose, the other optimization variables are all free variables that are unconstrained, and an updating mode is vector addition. The global degree of freedom of the pose is 4, and the local degree of the freedom of the pose is 3. The nominal value is expressed in the form of unit quaternion (or rotation matrix), and the error is an angle change in a local tangent space. During the optimization, the updating is performed through post-multiplying the error and exponential mapping. When there are totally (j−o+1) to-be-optimized frames in the entire sliding window, the degree of freedom for each frame is 3+3+3+3=12 (i.e., a sum of the degrees of freedom of the position, the pose, the speed and the zero offset of the gyroscope), and the degrees of freedom of all the to-be-solved variables are 12*(j−o+1)+4, with the addition of the scale of the wheel speed meter and the offset of the high-precision map.

In the embodiments of the present disclosure, the target function for the factor graph model is expressed as $$L(x) = \sum_k r_k^T \Omega_k r_k,$$

where x represents an optimization variable, $r_k$ represents a residual, T represents a vector transposition matrix, $\Omega_k$ represents an information matrix corresponding to each residual, $\Omega_k$ represents an inverse matrix of a covariance matrix $\Sigma_k$, and an optimization target is $$\min_x L(x).$$

In a possible embodiment of the present disclosure, the optimization solution is performed on the target function using a non-linear optimization method, e.g., Gauss-Newton method, Levenberg-Marquard method or Dogleg method. Through these methods, a complex Hessian matrix need not to be solved directly, and instead, an approximation is taken for each residual using first-order Taylor expansion $r_k(x^*+\Delta x)=r_k(x^*)+J_k\Delta x$, where $J_k$ is a first-order derivative of the residual versus the optimization variable, i.e., a Jacobi matrix. Hence, for each factor node, the residual, the Jacobi matrix and the information matrix need to be obtained. In addition, through the estimation of M, the target function is transformed into $$L(x) = \sum_k \rho(s_k),$$

where ρ represents a robustness function, and $s_k = r_k^T \Omega_k r_k$. In a possible embodiment of the present disclosure, the robustness function includes a Huber loss function or a Cauchy loss function.

In the embodiments of the present disclosure, the optimization solution on the target function in accordance with each type of sensor data is given in the form of factor nodes, and for each factor node, the residual, the Jacobi matrix about the optimization variable and the information matrix need to be defined specifically. The constraints in the factor graph model that may affect the factor nodes will be described hereinafter in details.

(1) GNSS Constraint

It should be appreciated that, the GNSS data includes longitude, latitude and altitude in a geodetic coordinate system, as well as a yaw angle and a speed in the local ENU coordinate system. After the longitude, the latitude and the altitude have been converted into the local ENU coordinate system, they directly provide a priori constraint on the position in the x-axis, the y-axis and the z-axis of the local ENU coordinate system. The yaw angle provides a priori constraint on a skyward rotation angle, and the speed also provides a priori constraint in the x-axis, the y-axis and the z-axis. Hence, the quantity of dimensions for the position constraint is 3, the quantity of dimensions for the pose constraint is 1, the quantity of dimensions for the speed constraint is 3, and a residual under the GNSS constraint is a 7-dimensional vector defined as $$r_{gnss} = \begin{bmatrix} r_p \\ r_q \\ r_v \end{bmatrix} = \begin{bmatrix} p_k - [p_e, p_n, p_u]^T \\ 2 \cdot (q_{head}^{-1} q_k)_z \\ v_k - [v_e, v_n, v_u]^T \end{bmatrix},$$

where $r_{gnss}$ represents a GNSS residual, $r_p$ represents a position residual, $r_q$ represents a pose residual, $r_v$ represents a speed residual, $p_k$, $q_k$ and $v_k$ represents a position, a pose and a speed in a $k^{th}$ frame respectively, $[p_e, p_n, p_u]^T$ represents a vector transposition matrix of GNSS position observed values at a corresponding time point, $q_{head}$ represents a pose created in accordance a GNSS yaw angle observed value and $q_{head}=(\cos(yaw/2), 0, 0, \sin(yaw/2))^T$, yaw represents the yaw angle, T represents a vector transposition matrix, $[v_e, v_n, v_u]^T$ represents a vector transposition matrix of GNSS speed observed values in eastward, northward and skyward directions, and a subscript x, y or z represents a component corresponding to a vector. Based on the residual, a Jacobi matrix of the residual with respect to errors of the optimization variables (in a chronological order of $\delta p_k$, $\delta \theta_k$ and $\delta v_k$) is obtained, and the Jacobi matrix is expressed as $$J_{gnss} = \begin{bmatrix} I & 0 & 0 \\ 0 & ([q_{head}^{-1} q_k]_L)_{br13} & 0 \\ 0 & 0 & I \end{bmatrix},$$

where $J_{gnss}$ represents the Jacobi matrix in the GNSS constraint, I represents a unit matrix, $[q]_L$ represents a premultiplication matrix (including four rows and four columns) corresponding to a unit quatemion, and a subscript br13 represents a matrix block in one row and three columns at a lower right corner. Here, the premultiplication matrix $[q]_L$ and a postmultiplication matrix $[q]_R$ of the unit quatemion are $$[q]_L = \begin{bmatrix} q_w & -q_x & -q_y & -q_z \\ q_x & q_w & -q_z & q_y \\ q_y & q_z & q_w & -q_x \\ q_z & -q_y & q_x & q_w \end{bmatrix} \text{ and}$$

$$[q]_R = \begin{bmatrix} q_w & -q_x & -q_y & -q_z \\ q_x & q_w & q_z & -q_y \\ q_y & -q_z & q_w & q_x \\ q_z & q_y & -q_x & q_w \end{bmatrix}$$

respectively.

A covariance matrix corresponding to the residual is a diagonal matrix, each diagonal element is a square of a noise standard deviation. Based on this, the information is $$\Omega_{gnss} = \text{diag}\left(\frac{1}{n_{p_e}^2}, \frac{1}{n_{p_n}^2}, \frac{1}{n_{p_u}^2}, \frac{1}{n_{yaw}^2}, \frac{1}{n_{v_e}^2}, \frac{1}{n_{v_n}^2}, \frac{1}{n_{v_u}^2}\right),$$

where $\Omega_{gnss}$ represents the information matrix in the GNSS constraint, $p_e$, $p_n$, $p_u$ are GNSS position observed values in eastward, northward and skyward directions respectively, $v_e$, $v_n$, $v_u$ are GNSS speed observed values in the eastward, northward and skyward directions respectively, yaw represents a yaw angle, n represents a corresponding noise, and $n_{yaw}$ represents a noise of the yaw angle.

(2) Wheel Speed Meter Speed Constraint

It should be appreciated that, the speed of the vehicle is also a state quantity, and it is directly measured by a wheel speed meter. The quantity of dimensions of a residual corresponding to the wheel speed meter is 3, and the residual is expressed as $$r_v = \frac{1}{s^v} q_k^{-1} \otimes v_k - v_{wheel},$$

where $r_v$ represents the residual corresponding to the wheel speed meter, $v_{wheel}$ represents an observed value of the wheel speed meter in a $k^{th}$ frame, $s^v$ represents a true value of the scale of the wheel speed meter, and $q_k$ and $v_k$ represent the pose and the speed of the vehicle in the $k^{th}$ frame respectively. A 3*7 Jacobi matrix of the residual corresponding to the wheel speed meter with respect TO ERRORS OF THE OPTIMIZATION VARIABLES (IN A CHRONOLOGICAL ORDER OF $\delta\theta_K$, $\delta v_K$ AND $\delta s^v$) is obtained, and the Jacobi matrix is expressed as $$J_v = \left[\left(\frac{1}{s^v} R_k^{-1} v_k\right)_\times \frac{1}{s^v} R_k^{-1} -\frac{1}{(s^v)^2} R_k^{-1} v_k\right],$$

where $J_v$ represents the Jacobi matrix in the wheel speed meter speed constraint, $R_k$ represents the pose of the vehicle in the $k^{th}$ frame, $v_k$ represents the speed of the vehicle in the $k^{th}$ frame, and $s^v$ represents the true value of the scale of the wheel speed meter.

Diagonal elements in the information matrix correspond to speed errors in three directions respectively, and the information matrix is expressed as $$\Omega_v = \text{diag}\left(\frac{1}{n_{v_x}^2}, \frac{1}{n_{v_y}^2}, \frac{1}{n_{v_z}^2}\right),$$

where $\Omega_v$ represents the information matrix in the wheel speed meter speed constraint, $v_x$, $v_y$, $v_z$ represent the speed observed values of the wheel speed meter in the eastward, northward and skyward directions respectively, and n represents a corresponding noise.

(3) Pre-Integration Constraint

The degree of observability of a pitch angle and a roll angle is relatively low, so when the pre-integration constraint is taken using an IMU, the translation pre-integration accuracy becomes worse due to errors of the two angles as well as a coupling effect of acceleration of gravity and a zero offset of an accelerometer. In the embodiments of the present disclosure, in the pre-integration constraint, relative movement in two adjacent frames is constrained through the wheel speed meter plus the gyroscope. A residual corresponding to the pre-integration constraint includes three parts, i.e., relative translation, relative rotation and zero offset instability of the gyroscope, and the quantity of dimensions of each part is 3, so the total quantity of dimensions of the residual is 9. The residual corresponding to the pre-integration constraint is expressed as $$r_{vg} = \begin{bmatrix} r_p \\ r_q \\ r_{bg} \end{bmatrix} = \begin{bmatrix} q_{k-1}^{-1} \otimes (p_k - p_{k-1}) - \alpha \\ 2 \cdot (\gamma^{-1} q_{k-1}^{-1} q_k)_{xyz} \\ b_k^g - b_{k-1}^g \end{bmatrix},$$

where $r_{vg}$ represents the residual corresponding to the pre-integration constraint, $r_p$ represents a position residual, $r_q$ represents a pose residual, $r_{bg}$ represents a gyroscope residual, $p_k$ represents a position of the vehicle in the $k^{th}$ frame, $p_{k-1}$ represents a position of the vehicle in a $(k-1)^{th}$ frame, $q_k$ represents a pose of the vehicle in the $k^{th}$ frame, $q_{k-1}$ represents a pose of the vehicle in the $(k-1)^{th}$ frame, $b_k$ represents a zero offset of a gyroscope in the $k^{th}$ frame, $b_{k-1}$ represents a zero offset of the gyroscope in the $(k-1)^{th}$ frame, $\alpha$ is a pre-integration nominal value of relative translation (a three-dimensional variable), $\gamma$ is a pre-integration nominal value of relative rotation (a rotation matrix), and $\alpha$ and $\gamma$ are obtained through integrating measured values of a linear speed and an angular speed in the two frames respectively. Errors of the optimization variables in the residual include $\delta p_{k-1}$, $\delta\theta_{k-1}^g$, $\delta p_k$, $\delta\theta_k$, $\delta b_k^g$ and $\delta s^v$, and a Jacobi matrix (having dimensions of 9*19) is expressed as $$J_{vg} = \begin{bmatrix} -R_{k-1}^{-1} & (R_{k-1}^{-1}(p_k - p_{k-1}))_{\times} & -\frac{\partial \delta\alpha}{\partial \delta b_{k-1}^g} & R_{k-1}^{-1} & 0 & 0 & \frac{\partial \delta\alpha}{\partial \delta s^v} \\ 0 & -([q_k^{-1} q_{k-1}]_L [\gamma]_R)_{br33} & -([q_k^{-1} q_{k-1} \gamma]_L)_{br33} \frac{\partial \delta\theta}{\partial \delta b_{k-1}^g} & 0 & ([\gamma^{-1} q_{k-1}^{-1} q_k]_L)_{br33} & 0 & 0 \\ 0 & 0 & -I & 0 & 0 & I & 0 \end{bmatrix},$$

where $\frac{\partial \delta\alpha}{\partial \delta b_{k-1}^g}$, $\frac{\partial \delta\alpha}{\partial \delta s^v}$ and $\frac{\partial \delta\theta}{\partial \delta b_{k-1}^g}$ ($\delta\alpha$ and $\delta\theta$ are perturbation errors of $\alpha$ and $\gamma$ respectively) are obtained through a pre-integration recursive process (which will be specifically described hereinafter).

A covariance of the residual is just a covariance of errors of pre-integration components, and it is a result caused when a measurement noise of a sensor is transmitted through the pre-integration. An information matrix corresponding to the pre-integration constraint is expressed as $\Omega_{vg} = \Sigma_{vg}^{-1}$.

Presumed that a sensor data sequence in the (k−1)th frame to the kth frame is 0, 1, . . . , m, how to obtain a nominal value and a covariance of the pre-integration component in accordance with the measured value and the noise of the sensor will be described hereinafter.

1) Error Model

An error model of the pre-integration component is defined as follows: $\alpha_t = \alpha + \delta\alpha$, $\gamma_t = \gamma \otimes \exp(\delta\theta)$, $b_t^g = b^g + \delta b^g$ and $s_t^v = s^v + \delta s^v$, where $\alpha_t$ represents a pre-integration quantity of the translation, $\alpha$ is a nominal value of the translation, $\delta\alpha$ is an error of the translation, $\gamma_t$ is a pre-integration component of the rotation (also called as pose), $\gamma$ is a nominal value of the rotation, $\delta\theta$ is an error of the rotation, $b_t^g$ is a true value of the zero offset of the gyroscope, $b^g$ is a nominal value of the zero offset of the gyroscope, $\delta b^g$ is an error of the zero offset of the gyroscope, $s_t^v$ is a true value of the scale of the wheel speed meter, $s^v$ is a nominal value of the scale of the wheel speed meter, and $\delta s^v$ is an error of the scale of the wheel speed meter.

The error model describes a relationship among the true value, the nominal value and the error. During the translation pre-integration, the scale of the wheel speed meter is used, so it is also taken as a state quantity, but it is always unchanged during the delivery.

2) Measurement Model

A linear speed measurement model of the wheel speed meter is $$v = \frac{v_t}{s_t^v} + n_v,$$

where $v$ is a measured value of a linear speed, $v_t$ is a true value of the linear speed, $s_t^v$ is a true value of the scale of the wheel speed meter, and $n_v$ is a noise of the linear speed measurement.

An angular speed measurement model of the gyroscope is $\omega = \omega_t + b_t^g + n_\omega$, where $\omega$ is a measured value of an angular speed, $\omega_t$ is a true value of the angular speed, $b_t^g$ is a true value of the zero offset of the gyroscope, and $n_\omega$ is a noise of the angular speed measurement.

3) Differential Equation of Pre-Integration True Value

The following differential equations for the true value are obtained in accordance with a rigid body kinematics model and a zero offset random walk hypothesis: $\dot\alpha_t = \gamma_t \otimes v_t$, $\dot\gamma_t = \gamma_t \otimes (\omega_t)_\times$ and $\dot b_t^g = n_{b^g}$.

4) Differential Equations of Nominal Value and Error

The true value may be represented by the nominal value, the error and the measured value in accordance with the measurement model and the error model, and then substituted into the differential equations of the true value, so as to obtain, through deduction, the differential equations of the nominal value and the error. A deduction process is shown in the following table.

| Pre-integration quantity | Deduction | Differential equation of nominal value | Differential equation of error |
|---|---|---|---|
| $b_t^g$ | $\dot b_t^g = \dot b^g + \delta \dot b^g = n_{b^g}$ | $\dot b^g = 0$ | $\delta \dot b^g = n_{b^g}$ |
| $\alpha_t$ | $\dot\alpha_t = \dot\alpha + \delta\dot\alpha$ $= \gamma_t \otimes v_t = \gamma \otimes \exp(\delta\theta) \otimes (v - n_v)(g^v + \delta s^v)$ | $\dot\alpha \approx \gamma \otimes s^v v$ | $\delta\dot\alpha \approx \gamma \otimes$ $(-s^v v_\times \delta\theta - s^v n_v + v\delta s^v)$ |

-continued

| Pre-integration quantity | Deduction | Differential equation of nominal value | Differential equation of error |
|---|---|---|---|
| | $\approx \gamma \otimes (I + (\delta\theta)_x \otimes (v - n_v)(s^v + \delta s^v)$ | | |
| | $\approx \gamma \otimes (s^v v - s^v v_x \delta\theta - s^v n_v + v\delta s^v)$ | | |
| $\gamma_t$ | $\dot{Y}_t = \gamma \otimes \exp(\delta\theta) = \dot{\gamma} \otimes \exp(\delta\theta) + \gamma \otimes (\exp(\delta\theta))\dot{\gamma} \approx \gamma \otimes (\omega - b^g)_x$ | $\delta\dot{\theta} \approx -(\omega - b^g)_x \delta\theta - \delta b^g - n_\omega$ | |
| | $\approx \dot{\gamma} \otimes (I + \delta\theta_x) + \gamma \otimes \dot{\delta}\theta_x$ | | |
| | $= \gamma_t \otimes (\omega_t)_x = \gamma \otimes \exp(\delta\theta) \otimes (\omega - b^H - \delta b^G - n_\omega)_x$ | | |
| | $\approx \gamma \otimes ((\omega - b^g)_n + \delta\theta_x (\omega - b^g)_x - (\delta b^H + n_\omega)_x)$ | | |

Jacobi identity is used in the reduction:
$a \times (b \times c) + b \times (c \times a) + c \times (a \times b) = 0$ Values observed by the sensor are discrete, so in actual use, recursive implementation is performed in the form of median integration. A recursive equation is expressed as $X_{r+1} = F_r(X_r, v_r, v_{r+1}, \omega_r, \omega_{r+1})$, where $$X_{r+1} = \begin{bmatrix} \alpha_{r+1} \\ \gamma_{r+1} \\ b^g_{r+1} \\ s^v \end{bmatrix}, \text{ and } X_r = \begin{bmatrix} \alpha_r \\ \gamma_r \\ b^g_r \\ s^v \end{bmatrix}.$$

About the Zero Offset of the Gyroscope

A differential value at a time point r is an approximation of difference values at time points r and r+1, and a deduction process is described as follows: $\dot{b}^g_r = (b^g_{r+1} - b^g_r)/\delta\tau_r = 0$, where $\delta\tau_r$ is a time difference, so $b^g_{r+1} = b^g_r$. Hence, nominal values of the zero offsets of the gyroscope in two adjacent frames are equal.

About the Rotation

An angular speed at the time point t is an average approximation of measured values at the time points r and r+1, and a deduction process is described as follows:

$$\dot{\gamma}_r = (\gamma_{r+1} - \gamma_r)/\delta\tau_r = \gamma_r \otimes \left(\frac{1}{2}(\omega_r + \omega_{r+1}) - b^g_r\right)_x,$$

so a recursive equation is $$\gamma_{r+1} = \gamma_r \otimes \left(I + \left(\frac{1}{2}(\omega_r + \omega_{r+1}) - b^g_r\right)_x \delta\tau_r\right).$$

The relative rotation nominal value in the residual expression is obtained through the recurrence from 0 to m, i.e., $\gamma = \gamma_m$.

About the Translation

A linear speed at the time point r is an average approximation of measured values at the time points r and r+1, and a deduction process is described as follows:

$$\dot{\alpha}_r = (\alpha_{r+1} - \alpha_r)/\delta\tau_r = \frac{1}{2}s^v(\gamma_r \otimes v_r + \gamma_{r+1} \otimes v_{r+1}),$$

so $\alpha_{r+1} = \alpha_r + \frac{1}{2}s^v(\gamma_r \otimes v_r + \gamma_{r+1} \otimes v_{r+1})\delta\tau_r$.

The relative translation nominal value in the residual expression is obtained through the recurrence from 0 to m, i.e., $\alpha = \alpha_m$.

6) Recursive Equation of Error

The error is delivered approximately using a linear relationship, and the recursive equation is expressed as $\delta X_{r+1} = \delta F_r \delta X_r + \delta G_r N_r$, where $$\delta X_{r+1} = \begin{bmatrix} \delta\alpha_{r+1} \\ \delta\theta_{r+1} \\ \delta b^g_{r+1} \\ \delta s^v \end{bmatrix}, \delta X_r = \begin{bmatrix} \delta\alpha_r \\ \delta\theta_r \\ \delta b^g_r \\ \delta s^v \end{bmatrix} \text{ and } N_r = \begin{bmatrix} n_{v_r} \\ n_{v_{r+1}} \\ n_{\omega_r} \\ n_{\omega_{r+1}} \\ n_{b^g_r} \end{bmatrix},$$

$N_r$ represents an observed noise of the sensor, $n_{v_r}$ and $n_{v_{r+1}}$ represent linear speed noises of the wheel speed meter at the time points r and r+1 respectively and they follow same Gaussian distribution, $n_{\omega_r}$ and $n_{\omega_{r+1}}$ represent angular speed noises of the gyroscope at the time points r and r+1 respectively and they follow same Gaussian distribution, and $n_{b_r g}$ represents an angular speed random walk noise at the time point r and it follows Gaussian distribution. Hence, a propagation form of an error covariance is $\Sigma_{r+1} = \delta F_r \Sigma_r \delta F_r^T + \delta G_r Q \delta G_r^T$, where Q is a covariance corresponding to $N_r$. A covariance of the residual is obtained through the recurrence from 0 to m, i.e., $\Sigma_{ve} = (\Sigma_m)_{1/99}$. A Jacobi propagation form corresponding to the pre-integration constraint is $J_{pre} = \delta F_{m-1} \ldots \delta F_{r+1} \cdot \delta F_r \ldots \delta F_0$, and $$\frac{\partial \delta\alpha}{\partial \delta b^g_{k-1}}, \frac{\partial \delta\alpha}{\partial \delta s^v} \text{ and } \frac{\partial \delta\theta}{\partial \delta b^g_{k-1}}$$

in $J_{vg}$ are relevant matrix blocks in the Jacobi matrix respectively.

About the Zero Offset of the Gyroscope

A differential value at the time point r is an approximation of a difference value, and a deduction process is described as follows:

$$\delta\dot{b}^g_r = (\delta b^g_{r+1} - \delta b^g_r)/\delta\tau_r = n_{b^g_r},$$

and a recursive equation is $$\delta b_{r+1}^g = \delta b_r^g + \delta \tau_r n_{b_r^g}.$$

About the Rotation

A rotation difference value at the time point is deduced as follows:

$$\delta \theta_r =$$

$$(\delta\theta_{r+1} - \delta\theta_r)/\delta\tau_r = -\left(\frac{1}{2}(\omega_r + \omega_{r+1}) - b_r^g\right)_\times \delta\theta_r - \delta b_r^g - \frac{1}{2}(n_{\omega_r} + n_{\omega_{r+1}}),$$

and a recursive equation is $$\delta\theta_{r+1} = \left(I - \left(\frac{1}{2}(\omega_r + \omega_{r+1}) - b_r^g\right)_\times \delta\tau_r\right)\delta\theta_r - \delta\tau_r \delta b_r^g - \frac{\delta\tau_r}{2}(n_{\omega_r} + n_{\omega_{r+1}}).$$

About the Translation

A translation difference value at the time point r is deduced as follows:

$$\delta\dot{\alpha}_r = (\delta\alpha_{r+1} - \delta\alpha_r)/\delta\tau_r$$
$$= \frac{1}{2}\gamma_r \otimes (-s^\nu(v_r)_\times \delta\theta_r - s^\nu n_{v_r} + v_r \delta s^\nu) +$$
$$\frac{1}{2}\gamma_{r+1} \otimes (-s^\nu(v_{r+1})_\times \delta\theta_{r+1} - s^\nu n_{v_{r+1}} + v_{r+1}\delta s^1$$

After substituting the recursive equation $\delta\theta_{r+1}$ into the above equation, $$\delta\alpha_{r+1} = \delta\alpha_r + \frac{\delta\tau_r}{2}\gamma_r \otimes (-s^\nu(v_r)_\times \delta\theta_r - s^\nu n_{v_r} + v_r \delta s^\nu) +$$

$$\frac{\delta\tau_r}{2}\gamma_{r+1} \otimes (-s^\nu v_{r+1})_\times \begin{pmatrix} \left(I - \left(\frac{1}{2}(\omega_r + \omega_{r+1}) - b_r^g\right)_\times \delta\tau_r\right)\delta\theta_r \\ -\delta\tau_r \delta b_r^g - \frac{\delta\tau_r}{2}(n_{\omega_r} + n_{\omega_{r+1}}) \end{pmatrix},$$

$$\text{and } + \frac{\delta\tau_r}{2}\gamma_{r+1} \otimes (-s^\nu n_{v_{r+1}} + v_{r+1}\delta s^\nu)$$

finally the following recursive equation is obtained:

$$\delta\alpha_{r+1} = \delta\alpha_r - \frac{\delta\tau_r}{2}\gamma_r \otimes s^\nu(v_r)_\times \delta\theta_r -$$

$$\frac{\delta\tau_r}{2}\gamma_{r+1} \otimes (s^\nu(v_{r+1})_\times \left(I - \left(\frac{1}{2}(\omega_r + \omega_{r+1}) - b_r^g\right)_\times \delta\tau_r\right)\delta\theta_r +$$

$$\frac{\delta\tau_r^2}{2}\gamma_{r+1} \otimes (s^\nu v_{r+1})_\times \delta b_r^g + \frac{\delta\tau_r}{2}(\gamma_r \otimes v_r + \gamma_{r+1} \otimes v_{r+1})\delta s^\nu - \frac{\delta\tau_r}{2}\gamma_r \otimes s^\nu n_{v_r} -$$

$$\frac{\delta\tau_r}{2}\gamma_{r+1} \otimes s^\nu n_{v_{r+1}} + \frac{\delta\tau_r^2}{4}\gamma_{r+1} \otimes (s^\nu v_{r+1})_\times n_{\omega_r} + \frac{\delta\tau_r^2}{4}\gamma_{r+1} \otimes (s^\nu v_{r+1})_\times n_{\omega_{r+1}}.$$

(4) Lane Line Constraint

Figure 5:
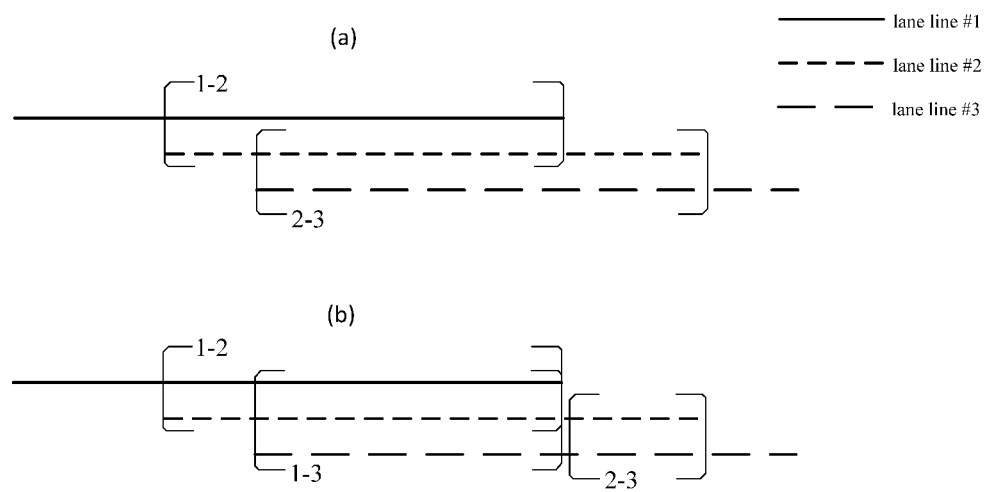
FIG. 5 is a schematic view showing the tracking of a lane line in the vehicle positioning method according to one embodiment of the present disclosure.

When a same lane line has been detected in different frames, the lane lines in two frames should coincide with each other after the conversion of the pose and position between the two frames, and at this time, the lane line is provided for the target function. As shown in FIG. 5, a same lane line is observed in three consecutive frames, and as a simple operation, the pose and position in two adjacent frames are constrained through the matching between the adjacent frames. As shown in FIG. 5(a), the pose and position in a first frame and a second frame, and those in the second frame and a third frame, are constrained through an overlapping portion of the corresponding lane lines. In addition, it is found that, a same lane line is probably observed in adjacent frames, and also an overlapping portion of the same lane lines is observed in non-adjacent frames, so an intra-frame constraint is also provided by inter-frame matching, as shown in FIG. 5(b). In this way, it is able to improve the accuracy of the optimization solution on the target function through the sensor data about more lane lines as well as more constraint relationships.

It should be appreciated that, a cubit curve equation defined in an x-y plane of a vehicle body is provided through sensing the lane lines, and it is inconvenient to directly calculate a distance between cubic curves. In addition, during the matching, merely an overlapping portion between the lane lines in two frames is taken into consideration, so in an appropriate mode, the lane line in a latter frame is discretized, and then a residual of an overlapping portion with the lane line in a former frame is calculated in the form of a point-to-line distance. As a most appropriate way, a vertical distance between one point and a cubic curve is calculated, but this way is complicated and a computational burden is relatively large. Hence, as a convenient way, two adjacent points are selected from the cubic curve to form a straight line with a local feature similar to the curve, and then a distance between the point and the straight line is calculated easily. It should be appreciated that, although the lane line is a curve equation on a two-dimensional plane, a road is assumed to have a flat surface, and a shift in a vertical direction may be constrained by a z-axis component of the point-to-line distance. Hence, the quantity of residual dimensions for the point-to-line distance is 3, and the residual corresponding to the lane line constraint is expressed as $$r_{s2s} = \frac{p_a - p_b}{|p_a - p_b|} \times \frac{(\tilde{p} - p_b) \times (\tilde{p} - p_a)}{|p_a - p_b|},$$

where a point $\tilde{p}$ is a position after a discrete point p in a current frame is transformed to a coordinate system in a previous frame with a transform expression $\tilde{p} = q_h^{-1} q_k \otimes p + q_h^{-1} \otimes (p_k - p_h)$, and $p_a$ and $p_b$ represent two neighbor points of the discrete point p in the previous frame. Through the residual, a horizontal distance is decoupled from a vertical distance, so as to set different weight coefficients conveniently. A Jacobi matrix (with dimensions of 3*12) of the residual with respect to the error of the optimization variables (in a chronological order of $\delta p_h$, $\delta\theta_h$, $\delta p_k$ and $\delta\theta_k$) is expressed as $$J_{s2s} = \left(\frac{(p_a - p_b)_\times}{|p_a - p_b|}\right)^2 \left[-R_h^{-1} \tilde{p}_\times R_h^{-1} \quad -R_h^{-1} R_k p_\times\right],$$

where $J_{s2s}$ represents the Jacobi matrix corresponding to the lane line constraint, and $R_h$ and $R_k$ represent rotation matrices of the pose.

The information matrix is a diagonal matrix, and diagonal elements correspond to distance errors in three directions. The information matrix is expressed as $$\Omega_{s2s} = \mathrm{diag}\left(\frac{1}{n_x^2}, \frac{1}{n_y^2}, \frac{1}{n_z^2}\right),$$

where $\Omega_{s2s}$ represents the information matrix corresponding to the lane line constraint, and $n_x$, $n_y$ and $n_z$ represent distance noises in the eastward, northward and skyward directions respectively.

(5) High-Precision Map Matching Constraint

It should be appreciated that, through the matching of the sensor data about the lane line and the lane line in the high-precision map, it is able to provide a constraint on the positioning of the vehicle, further improve the positioning accuracy, and compensate for an error in the high-precision map. The high-precision map matching is also performed on the basis of the point-to-line distance like the lane line matching, and the quantity of dimensions of a residual is 3. The residual corresponding to the high-precision map matching constraint is expressed as $$r_{s2m} = \frac{p'_a - p'_b}{|p'_a - p'_b|} \times \frac{(\tilde{p}' - p'_b) \times (\tilde{p}' - p'_a)}{|p'_a - p'_b|},$$

where a point $\tilde{p}'$ is a position after a discrete point $p'$ on lane line in the high-precision map is transformed to a coordinate system in a current frame with a transform expression $\tilde{p}' = q_k^{-1}(p' + b^{m} - p_k)$, and $p_a'$ and $p_b'$ represent two neighbor points of the discrete point $\tilde{p}'$ on the lane line. Hence, errors of the optimization variables related to the residual include $\delta p_k$, $\delta \theta_k$ and $\delta b^m$. A Jacobi matrix (with dimensions of 3*9) of the residual is expressed as $$J_{s2m} = \left(\frac{(p'_a - p'_b)}{|p'_a - p'_b|}\right)^2 \left[-R_k^{-1} \; \tilde{p}'_\times \; R_k^{-1}\right],$$

where $J_{s2m}$ represents the Jacobi matrix corresponding to the high-precision map matching constraint, and $R_k$ represents a rotation matrix of the pose.

The information matrix is expressed as $$\Omega_{s2m} = \mathrm{diag}\left(\frac{1}{n_x^2}, \frac{1}{n_y^2}, \frac{1}{n_z^2}\right),$$

where $\Omega_{s2m}$ represents the information transmission corresponding to the high-precision map matching constraint, and $n_x$, $n_y$ and $n_z$ represent noises in the eastward, northward and skyward directions respectively.

(6) Marginalization Constraint

In the embodiments of the present disclosure, the sliding window has a fixed size, i.e., the quantity of frames capable of being carried in the sliding window is fixed. When the sliding window moves, an oldest frame may be removed. When the oldest frame is directly discarded, an information loss may occur. In the embodiments of the present disclosure, relevant information about the removed frame is reserved through creating the marginalization constraint. The essence of the marginalization is to find a marginal probability of a remaining variable in accordance with the joint probability of all the variables. It is presumed that the optimization variables are $x$, the marginalized variables are $x_m$, the remaining variables are $x_r$, and the joint probability follows multi-dimensional Gaussian distribution and it is expressed as $x \sim N(\mu, \Sigma)$, where $\mu$ is an average value, $\Sigma$ is a covariance, $$\mu = \begin{bmatrix} \mu_m \\ \mu_r \end{bmatrix} \text{ and } \Sigma = \begin{bmatrix} \Sigma_{mm} & \Sigma_{mr} \\ \Sigma_{rm} & \Sigma_{rr} \end{bmatrix}.$$

During the optimization, an information form is adopted, i.e., $x \sim N^{-1}(\xi, \Omega)$, where $\Omega$ is an information matrix, $\Omega = \Sigma^{-1}$, $\xi$ is an information vector, $$\xi = \Sigma^{-1}\mu,$$
$$\xi = \begin{bmatrix} \xi_m \\ \xi_r \end{bmatrix},$$
$$\text{and } \Omega = \begin{bmatrix} \Omega_{mm} & \Omega_{mr} \\ \Omega_{rm} & \Omega_{rr} \end{bmatrix}.$$

Based on a relationship between the average value and the information vector, $$\begin{bmatrix} \Omega_{mm} & \Omega_{mr} \\ \Omega_{rm} & \Omega_{rr} \end{bmatrix} \begin{bmatrix} \mu_m \\ \mu_r \end{bmatrix} = \begin{bmatrix} \xi_m \\ \xi_r \end{bmatrix}.$$

Values in a first row is subtracted from two sides of an equation in a second row, and then a resultant value is postmultiplied by $\Omega_{rm}\Omega_{mm}^{-1}$ so as to obtain $$\begin{bmatrix} \Omega_{mm} & \Omega_{mr} \\ 0 & \Omega_{rr} - \Omega_{rm}\Omega_{mm}^{-1}\Omega_{mr} \end{bmatrix} \begin{bmatrix} \mu_m \\ \mu_r \end{bmatrix} = \begin{bmatrix} \xi_m \\ \xi_r - \Omega_{rm}\Omega_{mm}^{-1}\xi_m \end{bmatrix}.$$

In the equation in the second row, $(\Omega_{rr} - \Omega_{rm}\Omega_{mm}^{-1}\Omega_{mr})\mu_r = \xi_r - \Omega_{rm}\Omega_{mm}^{-1}\xi_m$.

Based on the above, the remaining variables follow the distribution $x_r \sim N^{-1}(\xi', \Omega')$, where $\xi' = -\Omega_{rm}\Omega_{mm}^{-1}\xi_m$ and $\Omega' = \Omega_{rr} - \Omega_{rm}\Omega_{mm}^{-1}\Omega_{mr}$.

In this way, through an elimination operation in linear algebra, it is able to obtain the marginalized Gaussian distribution of the remaining variables, where is called as a Schur complement of $\Omega_{mm}$. In an actual algorithm, merely the factors relative to the marginalized variables are selected to create the information matrix and the information vector, and perform the Schur complement operation, so as to create the marginalized constraint factor. The residual corresponding to the marginalization constraint is expressed as $r_m = x_r - u_r$, where $\mu_r = (\Omega')^{-1}\xi'$, dimensions of the residual are the same as dimensions of $x_r$, a Jacobi matrix of the marginalization constraint is a unit matrix, and an information matrix of the marginalization constraint is $\Omega'$.

In the embodiments of the present disclosure, the target function for the factor graph model is expressed as $$L(x) = \sum_k r_k^T \Omega_k r_k,$$

where $x$ represents an optimization variable, $r_k$ represents a residual, $T$ represents a vector transposition matrix, $\Omega_k$ represents an information matrix corresponding to each residual, $\Omega_k$ represents an inverse matrix of a covariance matrix $\Sigma_k$, and an optimization target is $$\min_x L(x).$$

In a possible embodiment of the present disclosure, the optimization solution is performed on the target function using a non-linear optimization method. Through the non-linear optimization method, a complex Hessian matrix is not solved directly, and instead, an approximation is taken for each residual using first-order Taylor expansion $r_k(x^*+\Delta x) = r_k(x^*) + J_k \Delta x$, where $J_k$ is a first-order derivative of the residual versus the optimization variable, i.e., a Jacobi matrix.

In the embodiments of the present disclosure, the optimization solution on the target function in accordance with each type of sensor data is given in the form of factor nodes. The factor nodes include the GNSS constraint, the wheel speed meter speed constraint, the pre-integration constraint, the lane line constraint, the high-precision map matching constraint and the marginalization constraint. The residual, the Jacobi matrix and the information matrix corresponding to each constraint have been described hereinabove. The optimization solution may be performed on the target function for the factor graph model in accordance with the residual the Jacobi matrix and the information matrix corresponding to each constraint, so as to obtain the pose and the position of the vehicle.

It should be appreciated that, in the embodiments of the present disclosure, the optimization solution is performed on the target function for the factor graph model in accordance with the sensor data about the N frames of the vehicle, i.e., the four types of sensor data including the GNSS data, the IMU data, the wheel speed meter data and the lane line data at N time points, as well as high-precision map, so as to obtain the pose and the position of the vehicle. For ease of understanding, the implementation of the present disclosure will be described hereinafter in more details.

In a possible embodiment of the present disclosure, the obtaining the sensor data about the N frames of the vehicle through the sliding window includes: obtaining lane line data about the N frames of the vehicle through the sliding window, and determining a timestamp for the lane line data about each frame; and obtaining GNSS data, wheel speed meter data and IMU data matching a timestamp for lane line data about a second target frame, so as to obtain sensor data about the second target frame. The second target frame is any frame in the N frames.

To be specific, after obtaining the lane line data about the N frames of the vehicle through the sliding window, the electronic device obtains the timestamp for the lane line data in each frame, and then obtains the other sensor data matching the timestamp for the lane line data with the timestamp as a reference, so as to obtain the complete sensor data about one frame. The sensor data about each frame just includes the lane line data, the GNSS data, the wheel speed meter data and the IMU data. The timestamps for the GNSS data, the wheel speed meter data and the IMU data in each frame matches, e.g., is the same as, the timestamp for the lane line data in the frame.

In the embodiments of the present disclosure, the timestamp for the lane line data in the sensor data about each frame is taken as a reference to obtain the other sensor data matching the timestamp, so that the pieces of sensor data about each frame are consistent in time, thereby it is able to improve the positioning accuracy of the vehicle.

In a possible embodiment of the present disclosure, the synchronization between the GNSS data and the wheel speed meter data is achieved through obtaining the GNSS data and the wheel speed meter data having a same timestamp as the lane line data are obtained. The synchronization between the IMU data and the wheel speed meter data is achieved through interpolation. For example, all the IMU data and the wheel speed meter data about a previous frame and a current frame is obtained, and when a timestamp for the lane line data to be synchronized is a time point t, a time point in the previous frame is t0 and a time point in the current frame is t1, the data after the linear interpolation is $x_t = (1-s) \times x_{t0} + s \times x_{t1}$, where $s = (t-t0)/(t1-t0)$.

It should be appreciated that, after obtaining the sensor data about the vehicle, the electronic device caches all the obtained sensor data, and the cached data is managed in the form of queue in a chronological order of the timestamps. The sliding window obtains the sensor data about the N frames sequentially from a cache region. For example, the sliding window obtains lane line data about an earliest frame, and then obtains the other sensor data matching the timestamp for the lane line data, so as to form the complete sensor data about one frame. After the sensor data about the N frames has been obtained, the target function for the factor graph model is created in accordance with the sensor data about the N frames, and then the optimization solution is performed on the target function so as to determine the pose and the position of the vehicle.

In a possible embodiment of the present disclosure, the creating the target function for the factor graph model in accordance with the sensor data about the N frames includes: determining whether initial positioning has been completed in accordance with sensor data about previous N−1 frames in the sensor data about the N frames; obtaining a first pose and position for sensor data about an $N^{th}$ frame through pre-integration, and creating the target function for the factor graph model in accordance with the sensor data about the N frames with the first pose and position as a reference when the initial positioning has been completed; and creating the target function for the factor graph model in accordance with the sensor data about the N frames when the initial positioning has not been completed yet.

It should be appreciated that, the initial positioning refers to creating the target function for the factor graph model in accordance with a part of sensor data in the sensor data about the N frames and performing the optimization solution on the target function to obtain the pose and position of the vehicle. In the embodiments of the present disclosure, in the case that the sliding window has been filled up, e.g., when the maximum quantity of frames to be carried by the sliding window is 10 and the sensor data about 10 frames has been obtained, the factor graph mode is created in accordance with the sensor data about the 10 frames. Presumed that the sensor data about a first frame to a tenth frame has been obtained and the target function for the factor graph mode has not be created in accordance with the sensor data about these 10 frames, it is impossible to obtain the pose and the position of the vehicle, i.e., the initial position has not been completed yet in accordance with the sensor data about these 10 frames. The sliding window slides in real time, i.e., the sensor data in the sliding window changes. For example, when the sensor data about a second frame to an eleventh frame has been obtained, the target function for the factor graph model has been created in accordance with the sensor data about previous 9 frames, i.e., the second frame to the tenth frame, and the optimization solution has been performed on the target function to obtain an initial pose and position (i.e., the first pose and position) of the vehicle, it means that the initial positioning has been completed in accordance with the sensor data about these 9 frames. The target function for the factor graph model is created in accordance with the sensor data about the second frame to the eleventh frame, and then the optimization solution is performed on the target function with the first pose and position as a reference, so as to obtain the pose and position of the vehicle more rapidly. When the first pose and position is taken as a reference, it is also able to ensure the positioning accuracy of the vehicle.

In a possible embodiment of the present disclosure, prior to determining whether the initial positioning has been completed in accordance with the sensor data about the previous N−1 frames in the sensor data about the N frames, the vehicle positioning method further includes obtaining the GNSS constraint, the wheel speed meter speed constraint and the pre-integration constraint in accordance with the sensor data about the N frames, wherein the creating the target function for the factor graph model in accordance with the sensor data about the N frames when the initial positioning has not been completed yet includes: creating an initial target function for the factor graph model in accordance with the GNSS constraint, the wheel speed meter speed constraint and the pre-integration constraint, and performing optimization solution on the initial target function to obtain an initial pose and position; tracking a lane line in accordance with the lane line data in the sensor data about the N frames, so as to obtain the lane line constraint; and creating the target function for the factor graph model in accordance with the GNSS constraint, the wheel speed meter speed constraint, the pre-integration constraint and the lane line constraint with the initial pose and position as a reference.

In the embodiments of the present disclosure, in the case that the initial positioning has not been completed in accordance with the sensor data about the previous N−1 frames, e.g., when N is 10 and the sensor data about the first frame to the tenth frame has been obtained, the target function for the factor graph model is created in accordance with the sensor data about the N frames for the first time, and the pose and position of the vehicle has not been obtained yet. In this scenario, the DNSS data, the wheel speed meter data and the IMU data in the sensor data about the 10 frames are obtained, and the corresponding GNSS constraint, wheel speed meter speed constraint and pre-integration constraint are obtained. Next, the initial target function for the factor graph model is created in accordance with the GNSS constraint, the wheel speed meter speed constraint and the pre-integration constraint, and the optimization solution is performed on the initial target function so as to obtain the initial pose and position of the vehicle.

It should be appreciated that, as compared with the target function, the initial target function merely does not include the lane line constraint, the high-precision map matching constraint and the marginalization constraint, and it is also created for the factor graph model and has a same mathematical principle as the target function, so the creation of the initial target function and its optimization solution may refer to those mentioned hereinabove, which will thus not be particularly defined herein.

It should be appreciated that, after the initial target function for the factor graph model has been created in accordance with the sensor data about the N frames and the optimization solution has been performed on the initial target function to obtain the initial pose and position of the vehicle, the marginalization constraint is created in accordance with the sensor data about the N frames and then stored (the creation of the marginalization constraint may refer to that mentioned hereinabove). When the sliding window moves, the marginalization constraint is used in the target function subsequently created in accordance with the sensor data, so as to determine the pose and the position of the vehicle more rapidly.

Further, after the initial pose and position of the vehicle has been obtained through the initial target function, the lane line is tracked in accordance with the lane line data about the first frame to the tenth frame, so as to obtain the lane line constraint in these 10 frames. Then, the target function for the factor graph model is created in accordance with the GNSS constraint, the wheel speed meter speed constraint, the pre-integration constraint and the lane line constraint in these 10 frames, and the optimization solution is performed on the target function to obtain the pose and the position of the vehicle.

Figure 6:
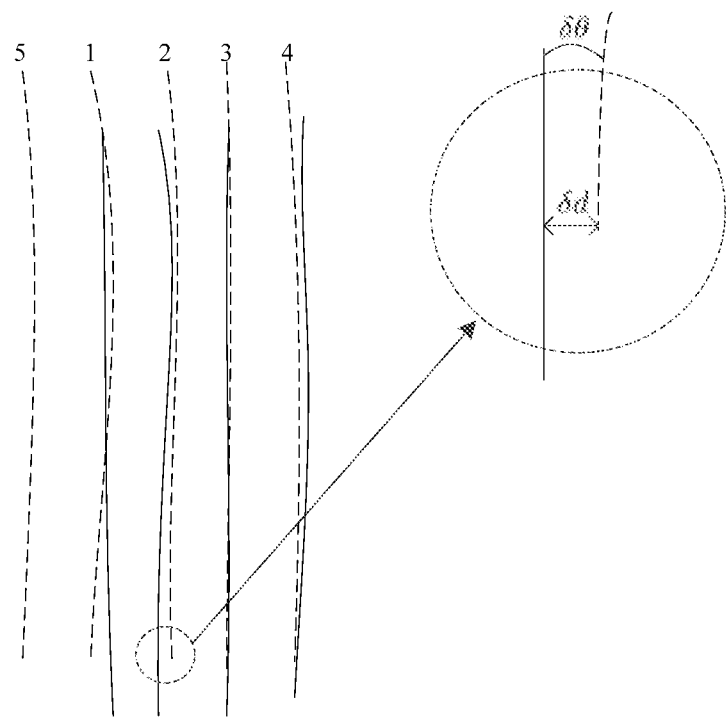
FIG. 6 is a schematic view showing the association of lane lines in the vehicle positioning method according to one embodiment of the present disclosure.

It should be appreciated that, the tracking of the lane line mainly includes tracking a same lane line in the lane line data about different frames. To be specific, the lane line data about two adjacent frames are associated with each other, and then a lane line number of each lane line is recorded. Each lane line is provided with a unique lane line number. As shown in FIG. 6, the lane line data about the first frame includes four lane lines (solid lines) with lane line numbers from 1 to 4, and the lane line data about the second frame includes five lane lines (dotted lines). Through data association, four of the five lane lines on the right are tracked, and they correspond to the four line lines with the lane line numbers 1 to 4 respectively. However, the leftmost lane line is not associated with the lane lines in the lane line data about the first frame successfully, so it is added as a new lane line and numbered as 5. The information about each lane line includes the frames in which the lane line has been observed and the lane line number in each frame. For example, a lane line 3 is observed simultaneously in the first frame and the second frame, and it belongs to a third lane (1, 3) in the first frame and a fourth lane (2, 4) in the second frame. Hence, it is able to obtain the frames in which each lane line has been observed and the corresponding lane line number in each frame.

The data association may also be abstracted into the solution of a maximum matching set of a weighted bipartite graph, i.e., weight conversion is performed on features of the lane line data that affect the positioning accuracy, and the solution is performed on the assignment problem as a whole, so as to directly obtain an optimal matching set at a data association stage. FIG. 6 shows the association of the lane lines. With respect to the screened lane line data, weight evaluation is performed from two aspects, i.e., a transverse intercept error $\delta d$ and a yaw angle error $\delta \theta$ at a starting point of a latter frame, as shown in FIG. 6. When each of them exceeds a predetermined threshold, it is directly rejected. For example, the predetermined threshold for the transverse intercept error is 0.5 m, and the predetermined threshold for the yaw angle error is 2.0°. It should be appreciated that, before the association of the lane line data, it is necessary to convert the lane line in a current frame into that in a previous frame in accordance with a predicted pose, and a matching weight calculation equation is expressed as $$w = c_d \cdot \left(1 - \frac{\delta d}{\overline{\delta d}}\right) + c_\theta \cdot \left(1 - \frac{\delta \theta}{\overline{\delta \theta}}\right),$$

where $\delta d$ represents the intercept error, $\delta \theta$ represents the yaw angle error, $\overline{\delta d}$ and $\overline{\delta d}$ represent the intercept threshold and the yaw angle threshold respective, $c_d$ and $c_\theta$ represent weights corresponding to the intercept and the yaw angle, and $c_d+c_\theta=1$. In a possible embodiment of the present disclosure, after the creation of a weight matrix, the maximum matching set is obtained through a Kuhn-Munkres algorithm. In this way, through tracking the lane lines, it is able to determine a same lane line in the lane line data about different frames, thereby to obtain the lane line constraint corresponding to the sensor data about the N frames.

In the embodiments of the present disclosure, after obtaining the lane line constraint through tracking the lane lines, the target function for the factor graph model is created in accordance with the GNSS constraint, the wheel speed meter speed constraint, the pre-integration constraint and the lane line constraint with the initial pose and position as a reference, and then the optimization solution is performed on the target function so as to obtain the pose and the position of the vehicle. The initial pose and position provides an optimization direction for the optimization solution on the target function, so as to obtain the pose and the position of the vehicle more rapidly and accurately.

In a possible embodiment of the present disclosure, the obtaining the first pose and position for sensor data about the $N^{th}$ frame through pre-integration and creating the target function for the factor graph model in accordance with the sensor data about the N frames with the first pose and position as a reference when the initial positioning has been completed includes: determining whether the sensor data about the $N^{th}$ frame is key frame data when the initial positioning has been completed; obtaining the first pose and position for the sensor data about the $N^{th}$ frame through pre-integration when the sensor data about the $N^{th}$ frame is key frame data; and creating the target function for the factor graph model in accordance with the sensor data about N frames with the first pose and position as a reference.

In the embodiments of the present disclosure, after obtaining the sensor data about the N frames, when the initial positioning has been completed in accordance with the sensor data about the previous N−1 frames, whether the sensor data about the $N^{th}$ frame is key frame data is determined. The key frame data refers to that a difference between the sensor data about this frame and the sensor data about a neighboring frame is within a predetermined range. For example, when the sensor data about a frame is the same as the sensor data about a previous frame, the sensor data about this frame is considered as key frame data. Alternatively, when a difference between the GNSS data about a frame and the GNSS data about each of the previous 5 frames is smaller than a predetermined threshold, this frame is determined as a key frame, and the sensor data about this frame is key frame data.

In a possible embodiment of the present disclosure, when the sensor data about the $N^{th}$ frame is key frame data, it means that there is a small difference between the sensor data about this frame and the sensor data about the previous frames. At this time, the first pose and position in the sensor data about the $N^{th}$ frame is obtained through pre-integration. It should be appreciated that, in this scenario, the initial positioning has been completed in accordance with the sensor data about the previous N−1 frames, i.e., the pose and the position of the vehicle have been obtained in accordance with the sensor data about the previous N−1 frames. At this time, the first pose and position in the sensor data about the $N^{th}$ frame is obtained in accordance with the obtained pose and position of the vehicle. For example, the first pose and position is obtained in accordance with the sensor data about the $N^{th}$ frame and the obtained pose and position of the vehicle using a calculation way in the pre-integration constraint, and then the target function for the factor graph model is created in accordance with the sensor data about the N frames with the first pose and position as a reference, so as to provide an optimization direction for the optimization solution on the target function, thereby to obtain the pose and position of the vehicle more rapidly.

In a possible embodiment of the present disclosure, the determining whether the sensor data about the $N^{th}$ frame is key frame data when the initial positioning has been completed includes: obtaining a relative pose and position of the sensor data about the $N^{th}$ frame relative to sensor data about an $(N-1)^{th}$ frame through pre-integration when the initial positioning has been completed; associating lane line data in the $N^{th}$ frame with lane line data in the $(N-1)^{th}$ frame in accordance with the relative pose and position, and removing the lane line data in the $(N-1)^{th}$ frame; combining the sensor data about the $N^{th}$ frame and the sensor data about the $(N-1)^{th}$ frame; and determining whether the sensor data about the $N^{th}$ frame combined with the sensor data about the $(N-1)^{th}$ frame is key frame data.

Figure 7:
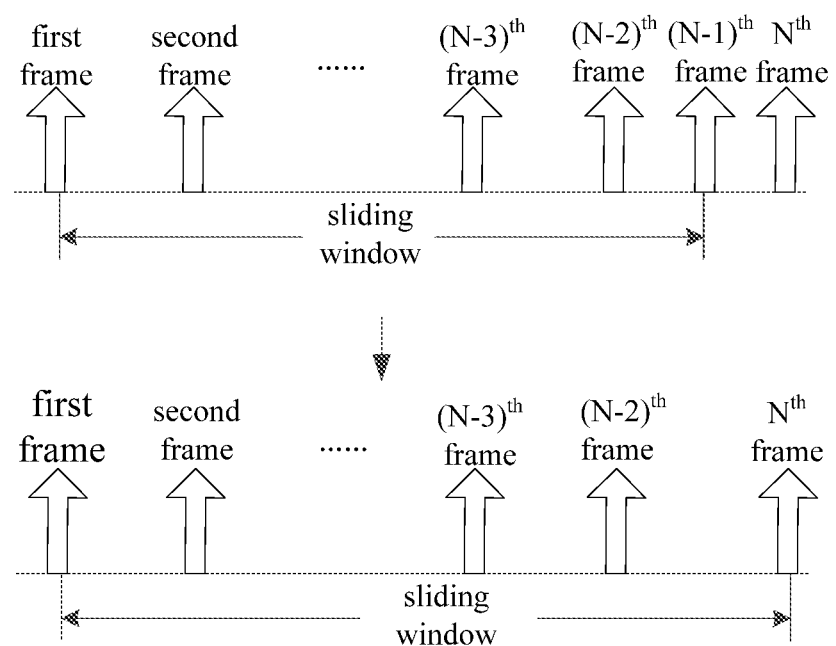
FIG. 7 is a schematic view showing the merging of lane line data in adjacent frames in the vehicle positioning method according to one embodiment of the present disclosure.

In the embodiments of the present disclosure, in the case that the initial positioning of the vehicle has been completed in accordance with the sensor data about the previous N−1 frames, the relative pose and position of the sensor data about the $N^{th}$ frame relative to the sensor data about the $(N-1)^{th}$ frame is obtained using the calculation way in the pre-integration constraint. Next, the lane line data about the $N^{th}$ frame is associated with the lane line data about the $(N-1)^{th}$ frame in accordance with the relative pose and position, and then the lane line data about the $(N-1)^{th}$ frame is removed. The combination of the lane line data about the adjacent frames is shown in FIG. 7. The implementation of the association of the lane line data may refer to that of the lane line tracking mentioned hereinabove. After the removal of the lane line data about the $(N-1)^{th}$ frame, the sensor data about the $N^{th}$ frame is combined with the sensor data about the $(N-1)^{th}$ frame, i.e., the GNSS data, the wheel speed meter data and the IMU data about the two frames are combined, e.g., through averaging. Further, whether the sensor data about the $N^{th}$ frame combined with the sensor data about the $(N-1)^{th}$ frame is key frame data.

In this way, through associating the lane line data about the $N^{th}$ frame with the lane line data about the $(N-1)^{th}$ frame, it is able to match the lane line data about a historical frame, for which the initial positioning has been completed, with the lane line data about an up-to-date frame, so as to reduce the error in the lane line data about the up-to-date frame. Then, the sensor data about the $N^{th}$ frame is combined with the sensor data about the $(N-1)^{th}$ frame, and whether the sensor data is key frame data is determined. Hence, it is able to adjust the sensor data about the up-to-date frame in accordance with the sensor data about the historical frame, thereby to reduce the error and improve the positioning accuracy.

In a possible embodiment of the present disclosure, subsequent to determining whether the sensor data about the $N^{th}$ frame is key frame data, the vehicle positioning method further includes performing dead reckoning in accordance with the wheel speed meter data and the IMU data in the sensor data about the $N^{th}$ frame when the sensor data about the $N^{th}$ frame is not key frame data, so as to determine the pose and position of the vehicle.

In the embodiments of the present disclosure, when the sensor data about the $N^{th}$ frame is not the key frame data, the dead reckoning is directly performed in accordance with the wheel speed meter data and the IMU data in the sensor data about the $N^{th}$ frame, so as to rapidly determine the pose and position of the vehicle without any necessity to create the target function. In a possible embodiment of the present disclosure, a way for dead reckoning is known in the art, and thus will not be particularly defined herein.

In a possible embodiment of the present disclosure, prior to creating the target function for the factor graph model in accordance with the sensor data about the N frames, the vehicle positioning method further includes: determining an origin of a target coordinate system in accordance with GNSS data corresponding to a first target frame, and updating GNSS data corresponding to each frame in accordance with the origin, the first target frame being any frame in the N frames; and obtaining the GNSS constraint in accordance with the updated GNSS data corresponding to each frame, wherein the pose and position of the vehicle is represented in accordance with the target coordinate system.

In the embodiments of the present disclosure, after obtaining the sensor data about the N frames of the vehicle, the origin of the target coordinate system is determined in accordance with the GNSS data corresponding to one frame, and then the GNSS data corresponding to the other frames is updated in accordance with the origin. For example, the first target frame is an intermediate frame in the N frames. When N is 10, a fifth frame is selected as the first target frame. The origin of the target coordinate system is determined in accordance with the GNSS data about the fifth frame, e.g., a longitude and a latitude corresponding to the GNSS data about the fifth frame are taken as coordinates of the origin, the GNSS data corresponding to the other of the 10 frames is updated in accordance with the origin. For example, the GNSS data about each of the other frames is updated in accordance with a difference between each of the longitude and the latitude in the other frame and a corresponding one of the longitude and the latitude corresponding to the origin. Further, the GNSS constraint is obtained in accordance with the updated GNSS data about each frame.

In the embodiments of the present disclosure, the sliding window is capable of carrying the sensor data about at most N frames, and it moves in real time. After obtaining the sensor data about the N frames, the origin of the target coordinate system is determined again in accordance with the GNSS data about the intermediate frame of the N frames, and then the GNSS data about the N frames is updated in accordance with the origin, so as to obtain the GNSS constraint. In this way, the GNSS constraint is obtained for the sensor data about every N frames in accordance with the re-determined origin, so it is able to prevent the occurrence of an error due to the calculation of all the GNSS data in accordance with the same origin, thereby to improve the accuracy of the GNSS constraint as well as the positioning accuracy of the vehicle.

In a possible embodiment of the present disclosure, the target coordinate system is a local ENU coordinate system or any other coordinate system. In the embodiments of the present disclosure, the target value obtained through the optimization solution on the target function is represented in accordance with the target coordinate system, e.g., the pose and position of the vehicle finally obtained is coordinate values in the target coordinate system.

In a possible embodiment of the present disclosure, subsequent to determining the pose and position of the vehicle in accordance with the target value obtained through the optimization solution on the target function, the vehicle positioning method further includes determining a target map in accordance with the first target frame, the lane line data corresponding to each frame in the sensor data about the N frames, and a relative position between the GNSS data corresponding to each frame and the GNSS data corresponding to the first target frame, and storing the target map.

In the embodiments of the present disclosure, for the sensor data about the N frames, the origin is determined in accordance with the GNSS data about the first target frame, and the GNSS data about the other frames is updated in accordance with the origin, i.e., the GNSS data about the N frames is generated on the basis of the target coordinate system. After the optimization solution is performed on the target function for the factor graph model created in accordance with the sensor data about the N frames to determine the pose and position of the vehicle, the target map is created in accordance with the first target frame, the lane line data corresponding to each frame in the sensor data about the N frames, and the relative position between the GNSS data corresponding to each frame and the GNSS data corresponding to the first target frame, and then the target map is stored.

It should be appreciated that, the target map is created in accordance with the sensor data about every N frames, and the sliding window moves in real time, so a plurality of target maps is created. The plurality of target maps is spliced to obtain a larger map. In this way, when positioning the vehicle in accordance with the sensor data about the vehicle, it is able to create a map corresponding to a region where the vehicle is running, i.e., it is able to create and update the map in accordance with the sensor data about the vehicle, e.g., update the lane line data, thereby to facilitate the path planning for the autonomous vehicle.

Figure 8:
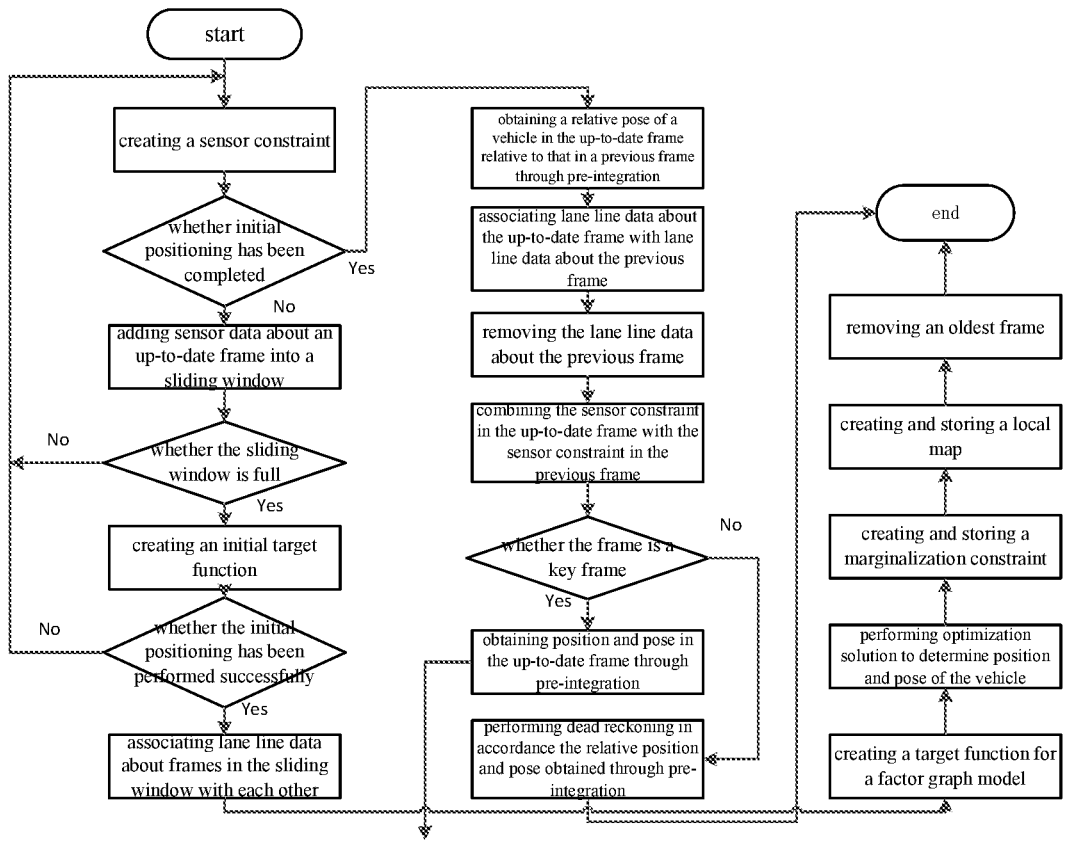
FIG. 8 is another flow chart of the vehicle positioning method according to one embodiment of the present disclosure.

FIG. 8 is another flow chart of the vehicle positioning method according to one embodiment of the present disclosure. As shown in FIG. 8, after obtaining the sensor data about the vehicle, the electronic device creates a sensor constraint on the sensor data. The sensor constraint includes the GNSS constraint, the wheel speed meter speed constraint, the pre-integration constraint and the lane line constraint. The creation of the sensor constraint may refer to that mentioned hereinabove, and thus will not be particularly defined herein. Further, whether the initial positioning has been completed in accordance with the obtained sensor data is determined, if not, the sensor data about the up-to-date frame is added into the sliding window, and whether the sliding window is full is determined, until the sliding window is filled up. Next, the initial target function for the factor graph model is created in accordance with the sensor data in the sliding window, and the optimization solution is performed on the initial target function. The initial target function is created in accordance with the GNSS constraint, the wheel speed meter speed constraint and the pre-integration constraint corresponding to the sensor data in the sliding window. Next, whether the initial positioning has been performed successfully, i.e., whether the optimization solution is performed to obtain the initial pose and position of the vehicle, is determined, until the initial positioning has been performed successfully. Next, the lane line data about the frames in the sliding window is associated with each other, so as to obtain the lane line constraint. Further, the target function for the factor graph model is created in accordance with the sensor data in the sliding window, and then the optimization solution is performed on the target function to determine the pose and position of the vehicle.

In a possible embodiment of the present disclosure, in the determining whether the initial positioning has been completed in accordance with the obtained sensor data, when the initial positioning has been completed, the relative pose of the vehicle in the up-to-date frame relative to that in the previous frame is obtained through the pre-integration, the lane line data about the up-to-date frame is associated with the lane line data about the previous frame, the lane line data about the previous frame is removed, and then the lane line data about the up-to-date frame is combined with the lane line data about the previous frame, so as to combine the sensor constraints in the up-to-date frame and the previous frame. Further, whether the up-to-date frame after the combination is a key frame; if not, the dead reckoning is performed in accordance with the relative pose and position, so as to determine the pose and position of the vehicle; and if yes, the pose and position in the up-to-date frame is obtained through the pre-integration. At this time, the target function for the factor graph model is created in accordance with all the sensor data in the sliding window with the pose and position in the up-to-date frame as a reference, and then the optimization solution is performed on the target function to determine the pose and position of the vehicle.

In a possible embodiment of the present disclosure, after performing the optimization solution on the target function to obtain the pose and position of the vehicle, the marginalization constraint is created in accordance with the sensor data in the sliding window, and then stored. Further, a local map is created in accordance with the sensor data in the sliding window, and then stored.

In a possible embodiment of the present disclosure, after determining the pose and position of the vehicle in accordance with the sensor data in the current sliding window, the sliding window moves, and the oldest frame in the sliding window is removed, so as to obtain new sensor data. Then, the target function for the factor graph model is created in accordance with the new sensor data, so as to determine the pose and position of the vehicle. In this way, through moving the sliding window, it is able to calculate and update the pose and position of the vehicle continuously.

Figure 9:
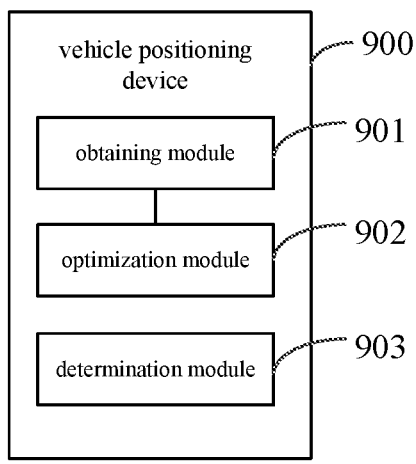
FIG. 9 is a schematic view showing a vehicle positioning device according to one embodiment of the present disclosure.

The present disclosure further provides in some embodiments a vehicle positioning device 900 which, as shown in FIG. 9, includes: an obtaining module 901 configured to obtain sensor data about N frames of a vehicle through a sliding window, N being a positive integer; an optimization module 902 configured to create a target function for a factor graph model in accordance with the sensor data about the N frames, and perform optimization solution on the target function; and a determination module 903 configured to determine a pose and a position of the vehicle in accordance with a target value obtained through the optimization solution on the target function.

In a possible embodiment of the present disclosure, the sensor data about each frame includes GNSS data, lane line data, wheel speed meter data, and IMU data, the target function for the factor graph model is related to a GNSS constraint, a lane line constraint, a wheel speed meter speed constraint, a pre-integration constraint and a marginalization constraint, the GNSS constraint is obtained in accordance with the GNSS data, the lane line constraint is obtained in accordance with the lane line data, the wheel speed meter speed constraint is obtained in accordance with the wheel speed meter data, the pre-integration constraint is obtained in accordance with the wheel speed meter data and the IMU data, the marginalization constraint is obtained in accordance with target sensor data about all frames, and the target sensor data is at least one of the GNSS data, the lane line data, the wheel speed meter data or the IMU data.

In a possible embodiment of the present disclosure, the optimization module 902 includes: a determination unit configured to determine whether initial positioning has been completed in accordance with sensor data about previous N−1 frames in the sensor data about the N frames; and a creation unit configured to obtain a first pose and position for sensor data about an $N^{th}$ frame through pre-integration, and create the target function for the factor graph model in accordance with the sensor data about the N frames with the first pose and position as a reference when the initial positioning has been completed. The creation unit is further configured to create the target function for the factor graph model in accordance with the sensor data about the N frames when the initial positioning has not been completed yet.

In a possible embodiment of the present disclosure, the optimization module 902 further includes an obtaining unit configured to obtain the GNSS constraint, the wheel speed meter speed constraint and the pre-integration constraint in accordance with the sensor data about the N frames. The creation unit is further configured to: create an initial target function for the factor graph model in accordance with the GNSS constraint, the wheel speed meter speed constraint and the pre-integration constraint, and perform optimization solution on the initial target function to obtain an initial pose and position; track a lane line in accordance with the lane line data in the sensor data about the N frames, so as to obtain the lane line constraint; and create the target function for the factor graph model in accordance with the GNSS constraint, the wheel speed meter speed constraint, the pre-integration constraint and the lane line constraint with the initial pose and position as a reference.

In a possible embodiment of the present disclosure, the creation unit is further configured to: determine whether the sensor data about the $N^{th}$ frame is key frame data when the initial positioning has been completed; obtain the first pose and position for the sensor data about the $N^{th}$ frame through pre-integration when the sensor data about the $N^{th}$ frame is key frame data; and create the target function for the factor graph model in accordance with the sensor data about N frames with the first pose and position as a reference.

In a possible embodiment of the present disclosure, the creation unit is further configured to perform dead reckoning in accordance with the wheel speed meter data and the IMU data in the sensor data about the $N^{th}$ frame when the sensor data about the $N^{th}$ frame is not key frame data, so as to determine the pose and position of the vehicle.

In a possible embodiment of the present disclosure, the determination unit is further configured to: obtain a relative pose of the sensor data about the $N^{th}$ frame relative to sensor data about an $(N-1)^{th}$ frame through pre-integration when the initial positioning has been completed; associate lane line data in the $N^{th}$ frame with lane line data in the $(N-1)^{th}$ frame in accordance with the relative pose and position, and remove the lane line data in the $(N-1)^{th}$ frame; combine the sensor data about the $N^{th}$ frame and the sensor data about the $(N-1)^{th}$ frame; and determine whether the sensor data about the $N^{th}$ frame combined with the sensor data about the $(N-1)^{th}$ frame is key frame data.

In a possible embodiment of the present disclosure, the vehicle positioning device 900 further includes an updating module configured to determine an origin of a target coordinate system in accordance with GNSS data corresponding to a first target frame, and update GNSS data corresponding to each frame in accordance with the origin, the first target frame being any frame in the N frames. The obtaining module 901 is further configured to obtain the GNSS constraint in accordance with the updated GNSS data corresponding to each frame. The pose and position of the vehicle is represented in accordance with the target coordinate system.

In a possible embodiment of the present disclosure, the vehicle positioning device 900 further includes a storage module configured to determine a target map in accordance with the first target frame, the lane line data corresponding to each frame in the sensor data about the N frames, and a relative position between the GNSS data corresponding to each frame and the GNSS data corresponding to the first target frame, and store the target map.

In a possible embodiment of the present disclosure, the sensor data about each frame further includes high-precision map data, the target function for the factor graph model is further related to a high-precision map matching constraint, and the high-precision map matching constraint is obtained in accordance with the high-precision map data and the lane line data.

In a possible embodiment of the present disclosure, the obtaining module 901 is further configured to: obtain lane line data about the N frames of the vehicle through the sliding window, and determine a timestamp for the lane line data about each frame; and obtain GNSS data, wheel speed meter data and IMU data matching a timestamp for lane line data about a second target frame, so as to obtain sensor data about the second target frame. The second target frame is any frame in the N frames.

It should be appreciated that, the vehicle positioning device 900 in the embodiments of the present disclosure is capable of implementing all the technical solutions in the above-mentioned method embodiments with a same technical effect, which will thus not be particularly defined herein.

The collection, storage, usage, processing, transmission, supply and publication of personal information involved in the embodiments of the present disclosure comply with relevant laws and regulations, and do not violate the principle of the public order.

The present disclosure further provides in some embodiments an electronic device, a computer-readable storage medium and a computer program product.

Figure 10:
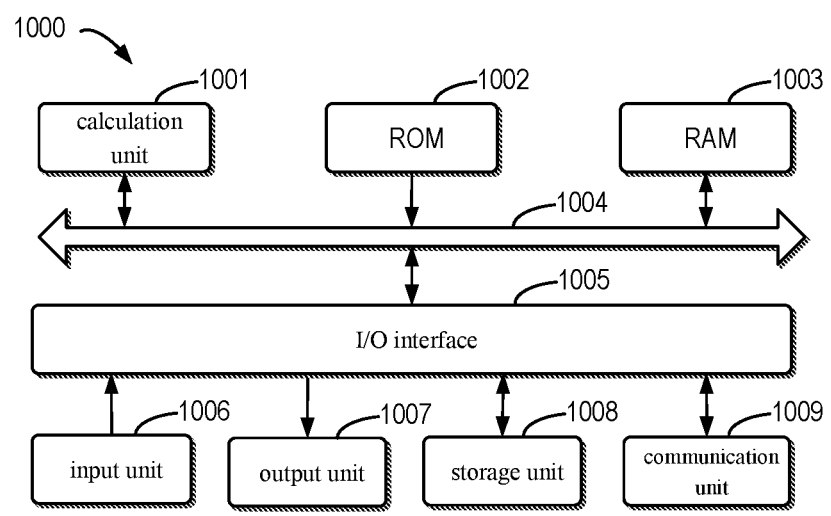
FIG. 10 is a block diagram of an electronic device for implementing the vehicle positioning method according to one embodiment of the present disclosure.

FIG. 10 is a schematic block diagram of an exemplary electronic device 1000 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 10, the electronic device 1000 includes a computing unit 1001 configured to execute various processings in accordance with computer programs stored in a Read Only Memory (ROM) 1002 or computer programs loaded into a Random Access Memory (RAM) 1003 via a storage unit 1008. Various programs and data desired for the operation of the electronic device 1000 may also be stored in the RAM 1003. The computing unit 1001, the ROM 1002 and the RAM 1003 may be connected to each other via a bus 1004. In addition, an input/output (I/O) interface 1005 may also be connected to the bus 1004.

Multiple components in the electronic device 1000 are connected to the I/O interface 1005. The multiple components include: an input unit 1006, e.g., a keyboard, a mouse and the like; an output unit 1007, e.g., a variety of displays, loudspeakers, and the like; a storage unit 1008, e.g., a magnetic disk, an optic disk and the like; and a communication unit 1009, e.g., a network card, a modem, a wireless transceiver, and the like. The communication unit 1009 allows the electronic device 1000 to exchange information/data with other devices through a computer network and/or other telecommunication networks, such as the Internet.

The computing unit 1001 may be any general purpose and/or special purpose processing components having a processing and computing capability. Some examples of the computing unit 1001 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 1001 carries out the aforementioned methods and processes, e.g., the vehicle positioning method. For example, in some embodiments of the present disclosure, the vehicle positioning method may be implemented as a computer software program tangibly embodied in a machine readable medium such as the storage unit 1008. In some embodiments of the present disclosure, all or a part of the computer program may be loaded and/or installed on the electronic device 1000 through the ROM 1002 and/or the communication unit 1009. When the computer program is loaded into the RAM 1003 and executed by the computing unit 1001, one or more steps of the foregoing vehicle positioning method may be implemented. Optionally, in some other embodiments of the present disclosure, the computing unit 1001 may be configured in any other suitable manner (e.g., by means of firmware) to implement the digital signature method or the vehicle positioning method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server may be a cloud server, a server of a distributed system, or a server combined with blockchain.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A vehicle positioning method implemented by an electronic device, the vehicle positioning method comprising:
    obtaining sensor data about N frames of a vehicle through a sliding window, N being a positive integer;
    creating a target function for a factor graph model in accordance with the sensor data about the N frames, and performing optimization solution on the target function; and
    determining a pose and a position of the vehicle in accordance with a target value obtained through the optimization solution on the target function,
    wherein the sensor data about each frame comprises Global Navigation Satellite Systems (GNSS) data, lane line data, wheel speed meter data, and Inertial Measurement Unit (IMU) data,
    the target function for the factor graph model is related to a GNSS constraint, a lane line constraint, a wheel speed meter speed constraint, a pre-intergration constraint and a marginalization constraint,
    the GNSS constraint is obtained in accordance with the GNSS data, the lane line constraint is obtained in accordance with the lane line data, the wheel speed meter speed constraint is obtained in accordance with the wheel speed meter data, the pre-intergration constraint is obtained in accordance with the wheel speed meter data and the IMU data, the marginalization constraint is obtained in accordance with target sensor data about all frames, and the target sensor data is at least one of the GNSS data, the lane line data, the wheel speed meter data or the IMU data.

2. The vehicle positioning method according to claim 1, wherein the creating the target function for the factor graph model in accordance with the sensor data about the N frames comprises:
    determining whether initial positioning has been completed in accordance with sensor data about previous N−1 frames in the sensor data about the N frames;
    obtaining a first pose and position for sensor data about an $N^{th}$ frame through pre-integration, and creating the target function for the factor graph model in accordance with the sensor data about the N frames with the first pose and position as a reference when the initial positioning has been completed; and
    creating the target function for the factor graph model in accordance with the sensor data about the N frames when the initial positioning has not been completed yet.

3. The vehicle positioning method according to claim 2, wherein prior to determining whether the initial positioning has been completed in accordance with the sensor data about the previous N−1 frames in the sensor data about the N frames, the vehicle positioning method further comprises:
    obtaining the GNSS constraint, the wheel speed meter speed constraint and the pre-integration constraint in accordance with the sensor data about the N frames,
    wherein the creating the target function for the factor graph model in accordance with the sensor data about the N frames when the initial positioning has not been completed yet comprises:
    creating an initial target function for the factor graph model in accordance with the GNSS constraint, the wheel speed meter speed constraint and the pre-integration constraint, and performing optimization solution on the initial target function to obtain an initial pose and position;

tracking a lane line in accordance with the lane line data in the sensor data about the N frames, so as to obtain the lane line constraint; and creating the target function for the factor graph model in accordance with the GNSS constraint, the wheel speed meter speed constraint, the pre-integration constraint and the lane line constraint with the initial pose and position as a reference.

4. The vehicle positioning method according to claim 2, wherein the obtaining the first pose and position for sensor data about the $N^{th}$ frame through pre-integration and creating the target function for the factor graph model in accordance with the sensor data about the N frames with the first pose and position as a reference when the initial positioning has been completed comprises:

determining whether the sensor data about the $N^{th}$ frame is key frame data when the initial positioning has been completed;

obtaining the first pose and position for the sensor data about the $N^{th}$ frame through pre-integration when the sensor data about the $N^{th}$ frame is key frame data; and creating the target function for the factor graph model in accordance with the sensor data about N frames with the first pose and position as a reference.

5. The vehicle positioning method according to claim 4, wherein subsequent to determining whether the sensor data about the $N^{th}$ frame is key frame data, the vehicle positioning method further comprises:

performing dead reckoning in accordance with the wheel speed meter data and the IMU data in the sensor data about the $N^{th}$ frame when the sensor data about the $N^{th}$ frame is not key frame data, so as to determine the pose and position of the vehicle.

6. The vehicle positioning method according to claim 4, wherein the determining whether the sensor data about the $N^{th}$ frame is key frame data when the initial positioning has been completed comprises:

obtaining a relative pose and position of the sensor data about the $N^{th}$ frame relative to sensor data about an $(N-1)^{th}$ frame through pre-integration when the initial positioning has been completed;

associating lane line data in the $N^{th}$ frame with lane line data in the $(N-1)^{th}$ frame in accordance with the relative pose and position, and removing the lane line data in the $(N-1)^{th}$ frame;

combining the sensor data about the $N^{th}$ frame and the sensor data about the (N−1)th frame; and determining whether the sensor data about the Nth frame combined with the sensor data about the $(N-1)^{th}$ frame is key frame data.

7. The vehicle positioning method according to claim 1, wherein prior to creating the target function for the factor graph model in accordance with the sensor data about the N frames, the vehicle positioning method further comprises:

determining an origin of a target coordinate system in accordance with GNSS data corresponding to a first target frame, and updating GNSS data corresponding to each frame in accordance with the origin, the first target frame being any frame in the N frames; and obtaining the GNSS constraint in accordance with the updated GNSS data corresponding to each frame, wherein the pose and position of the vehicle is represented in accordance with the target coordinate system.

8. The vehicle positioning method according to claim 7, wherein subsequent to determining the pose and position of the vehicle in accordance with the target value obtained through the optimization solution on the target function, the vehicle positioning method further comprises:

determining a target map in accordance with the first target frame, the lane line data corresponding to each frame in the sensor data about the N frames, and a relative position between the GNSS data corresponding to each frame and the GNSS data corresponding to the first target frame, and storing the target map.

9. The vehicle positioning method according to claim 1, wherein the sensor data about each frame further comprises high-precision map data, the target function for the factor graph model is further related to a high-precision map matching constraint, and the high-precision map matching constraint is obtained in accordance with the high-precision map data and the lane line data.

10. The vehicle positioning method according to claim 1, wherein the obtaining the sensor data about the N frames of the vehicle through the sliding window comprises:

obtaining lane line data about the N frames of the vehicle through the sliding window, and determining a timestamp for the lane line data about each frame; and obtaining GNSS data, wheel speed meter data and IMU data matching a timestamp for lane line data about a second target frame, so as to obtain sensor data about the second target frame, wherein the second target frame is any frame in the N frames.

11. The vehicle positioning method according to claim 1, wherein a residual under the GNSS constraint is a 7-dimensional vector defined as $$r_{gnss} = \begin{bmatrix} r_p \\ r_q \\ r_v \end{bmatrix} = \begin{bmatrix} p_k - [p_e, p_n, p_u]^T \\ 2 \cdot (q_{head}^{-1} q_k)_z \\ v_k - [v_e, v_n, v_u]^T \end{bmatrix},$$

where $r_{gnss}$ represents a GNSS residual, $r_p$ represents a position residual, $r_q$ represents a pose residual, $r_v$ represents a speed residual, $p_k$, $q_k$ and $v_k$ represents a position, a pose and a speed in a $k^{th}$ frame respectively, $[p_e, p_n, p_u]^T$ represents a vector transposition matrix of GNSS position observed values at a corresponding time point, head represents a pose created in accordance a GNSS yaw angle observed value and $q_{head}=(\cos(yaw/2), 0, 0, \sin(yaw/2))^T$, yaw represents the yaw angle, T represents a vector transposition matrix, $[v_e, v_n, v_u]^T$ represents a vector transposition matrix of GNSS speed observed values in eastward, northward and skyward directions, and a subscript x, y or z represents a component corresponding to a vector.

12. The vehicle positioning method according to claim 1, wherein a quantity of residual dimensions for a point-to-line distance is 3, and a residual corresponding to the lane line constraint is expressed as $$r_{s2s} = \frac{p_a - p_b}{|p_a - p_b|} \times \frac{(\tilde{p} - p_b) \times (\tilde{p} - p_a)}{|p_a - p_b|},$$

where a point $\tilde{p}$ is a position after a discrete point p in a current frame is transformed to a coordinate system in a previous frame with a transform expression $\tilde{p}=q_h^{-1}q_k \otimes p_h^{-1} \otimes (p_k-p_h)$, $p_a$ and $p_b$ represent two neighbor points of the discrete point p in the previous frame, $p_k$, $q_k$ represents a position and a pose in a $k^{th}$ frame respectively, and $p_h$, $q_h$ represents a position and a pose in the $h^{th}$ frame respectively.

13. The vehicle positioning method according to claim 1, wherein a residual corresponding to the marginalization constraint is expressed as $r_m = x_r - u_r$, where $\mu_r = (\Omega')^{-1}\xi'$, dimensions of the residual are the same as dimensions of $x_r$, a Jacobi matrix of the marginalization constraint is a unit matrix, and an information matrix of the marginalization constraint is $\Omega'$.

14. The vehicle positioning method according to claim 1, wherein a residual corresponding to the pre-integration constraint is expressed as $$r_{vg} = \begin{bmatrix} r_p \\ r_q \\ r_{bg} \end{bmatrix} = \begin{bmatrix} q_{k-1}^{-1} \otimes (p_k - p_{k-1}) - \alpha \\ 2 \cdot (\gamma^{-1} q_{k-1}^{-1} q_k)_{xyz} \\ b_k^g - b_{k-1}^g \end{bmatrix},$$

where $r_{vg}$ represents the residual corresponding to the pre-integration constraint, $r_p$ represents a position residual, $r_q$ represents a pose residual, $r_{bg}$ represents a gyroscope residual, $p_k$ represents a position of the vehicle in a $k^{th}$ frame, $p_{k-1}$ represents a position of the vehicle in a $(k-1)^{th}$ frame, $q_k$ represents a pose of the vehicle in the $k^{th}$ frame, $q_{k-1}$ represents a pose of the vehicle in the $(k-1)^{th}$ frame, $b_k$ represents a zero offset of a gyroscope in the $k^{th}$ frame, $b_{k-1}$ represents a zero offset of the gyroscope in the $(k-1)^{th}$ frame, a is a pre-integration nominal value of relative translation of a three-dimensional variable, and $\gamma$ is a pre-integration nominal value of a relative rotation matrix.

15. The vehicle positioning method according to claim 1, wherein the target function for the factor graph model is expressed as $$L(x) = \sum_k r_k^T \Omega_k r_k,$$

where x represents an optimization variable, $r_k$ represents a residual, T represents a vector transposition matrix, $\Omega_k$ represents an information matrix corresponding to each residual, $\Omega_k$ represents an inverse matrix of a covariance matrix $\Sigma_k$, and an optimization target is $$\min_x L(x).$$

16. An electronic device, comprising at least one processor, and a memory in communication with the at least one processor, wherein an instruction is stored in the memory and executed by the at least one processor, so as to implement a vehicle positioning method, comprising:
obtaining sensor data about N frames of a vehicle through a sliding window, N being a positive integer;
creating a target function for a factor graph model in accordance with the sensor data about the N frames, and performing optimization solution on the target function; and
determining a pose and a position of the vehicle in accordance with a target value obtained through the optimization solution on the target function,
wherein the sensor data about each frame comprises Global Navigation Satellite Systems (GNSS) data, lane line data, wheel speed meter data, and Inertial Measurement Unit (IMU) data,
the target function for the factor graph model is related to a GNSS constraint, a lane line constraint, a wheel speed meter speed constraint, a pre-intergration constraint and a marginalization constraint,
the GNSS constraint is obtained in accordance with the GNSS data, the lane line constraint is obtained in accordance with the lane line data, the wheel speed meter speed constraint is obtained in accordance with the wheel speed meter data, the pre-intergration constraint is obtained in accordance with the wheel speed meter data and the IMU data, the marginalization constraint is obtained in accordance with target sensor data about all frames, and the target sensor data is at least one of the GNSS data, the lane line data, the wheel speed meter data or the IMU data.

17. A non-transitory computer-readable storage medium storing therein a computer instruction, wherein the computer instruction is executed by a processor so as to implement a vehicle positioning method implemented by an electronic device, comprising:
obtaining sensor data about N frames of a vehicle through a sliding window, N being a positive integer;
creating a target function for a factor graph model in accordance with the sensor data about the N frames, and performing optimization solution on the target function; and
determining a pose and a position of the vehicle in accordance with a target value obtained through the optimization solution on the target function,
wherein the sensor data about each frame comprises Global Navigation Satellite Systems (GNSS) data, lane line data, wheel speed meter data, and Inertial Measurement Unit (IMU) data,
the target function for the factor graph model is related to a GNSS constraint, a lane line constraint, a wheel speed meter speed constraint, a pre-intergration constraint and a marginalization constraint,
the GNSS constraint is obtained in accordance with the GNSS data, the lane line constraint is obtained in accordance with the lane line data, the wheel speed meter speed constraint is obtained in accordance with the wheel speed meter data, the pre-intergration constraint is obtained in accordance with the wheel speed meter data and the IMU data, the marginalization constraint is obtained in accordance with target sensor data about all frames, and the target sensor data is at least one of the GNSS data, the lane line data, the wheel speed meter data or the IMU data.

\* \* \* \* \*